United States Patent
Chen

(10) Patent No.: US 8,093,541 B2
(45) Date of Patent: Jan. 10, 2012

(54) ANTI-BLOOMING PROTECTION OF PIXELS IN A PIXEL ARRAY FOR MULTIPLE SCALING MODES

(75) Inventor: Yandong Chen, Pasadena, CA (US)

(73) Assignee: Aptina Imaging Corporation, George Town (KY)

( * ) Notice: Subject to any disclaimer, the term of this patent is extended or adjusted under 35 U.S.C. 154(b) by 813 days.

(21) Appl. No.: 12/155,531

(22) Filed: Jun. 5, 2008

(65) Prior Publication Data

US 2009/0302359 A1 Dec. 10, 2009

(51) Int. Cl.
*H01L 27/00* (2006.01)

(52) U.S. Cl. ........... 250/208.1; 250/214.1; 250/214 DC; 348/295; 348/297; 348/307; 348/308

(58) Field of Classification Search ............... 250/208.1, 250/208.2, 214.1, 214 R, 214 DC; 348/294, 348/295, 297, 302, 307, 308; 257/431
See application file for complete search history.

(56) References Cited

U.S. PATENT DOCUMENTS

| | | | |
|---|---|---|---|
| 6,633,028 B2 | 10/2003 | Fowler | |
| 6,777,662 B2 | 8/2004 | Drowley et al. | |
| 7,002,626 B2 | 2/2006 | Pain et al. | |
| 7,238,977 B2 | 7/2007 | Hong et al. | |
| 7,271,835 B2 | 9/2007 | Iizuka et al. | |
| 7,332,786 B2 | 2/2008 | Altice, Jr. et al. | |
| 2003/0111674 A1 | 6/2003 | Fossum | |
| 2004/0036784 A1 | 2/2004 | Bock | |
| 2004/0036787 A1* | 2/2004 | Barna | 348/308 |
| 2004/0085466 A1 | 5/2004 | Herold | |
| 2005/0151866 A1 | 7/2005 | Ando et al. | |
| 2005/0167571 A1* | 8/2005 | Altice et al. | 250/208.1 |
| 2006/0023097 A1 | 2/2006 | Watanabe | |
| 2006/0092300 A1 | 5/2006 | Tan et al. | |
| 2006/0097132 A1* | 5/2006 | Nam et al. | 250/208.1 |
| 2006/0238632 A1 | 10/2006 | Shah | |
| 2006/0249731 A1* | 11/2006 | Ladd | 257/59 |
| 2006/0284222 A1 | 12/2006 | Hong et al. | |
| 2007/0029637 A1 | 2/2007 | Rhodes et al. | |
| 2007/0045681 A1 | 3/2007 | Mauritzson et al. | |
| 2007/0102781 A1 | 5/2007 | Ladd | |
| 2007/0114629 A1 | 5/2007 | Dosluoglu et al. | |

(Continued)

FOREIGN PATENT DOCUMENTS

EP 1 775 934 A2 4/2007

(Continued)

OTHER PUBLICATIONS

Shinya Ohba, et al., "MOS Area Sensor: Part II—Low-Noise MOS Area Sensor with Antiblooming Photodiodes," IEEE Transactions on Electron Devices, vol. ED 27, No. 8, Aug. 1980, pp. 1682-1687.

(Continued)

*Primary Examiner* — Francis M Legasse, Jr.

(57) ABSTRACT

Circuits and methods of generating control signals for transistors in a pixel row of a pixel array are disclosed. The circuits include a transfer transistor control signal row driver that includes a plurality of output branches and a reset transistor control signal row driver that includes a plurality of output branches. The row drivers output positive boosted control signals to selected pixel rows during a photosensor-to-floating diffusion region charge transfer phase and during a floating diffusion region reset phase and to unselected pixel rows during an initial part of an integration phase. The row drivers output positive non-boosted control signals to unselected non-integrating pixel rows.

31 Claims, 17 Drawing Sheets

U.S. PATENT DOCUMENTS

| | | |
|---|---|---|
| 2007/0257286 A1 | 11/2007 | Hynecek |
| 2007/0272828 A1 | 11/2007 | Xu |
| 2007/0272830 A1 | 11/2007 | Altice, Jr. et al. |
| 2008/0017901 A1 | 1/2008 | Sato et al. |

FOREIGN PATENT DOCUMENTS

| | | |
|---|---|---|
| JP | 2004-297089 | 10/2004 |
| JP | 2006-310932 | 11/2006 |
| JP | 2007-123604 | 5/2007 |
| KR | 20010038178 | 5/2001 |
| WO | WO 2004/043078 A1 | 5/2004 |
| WO | WO 2007/024582 A1 | 3/2007 |
| WO | WO 2007/127051 A1 | 11/2007 |

OTHER PUBLICATIONS

Guang Yang, et al., "A Snap-Shot CMOS Active Pixel Imager for Low-Noise, High-Speed Imaging," Electron Devices Meeting, 1998, IEDM '98 Technical Digest, International Publication Date: Dec. 6-9, 1998, pp. 45-48.

R.H. Nixon, et al., "256×256 CMOS Active Pixel Sensor Camera-on-a-chip," Solid-State Circuit Conference, 1996, Digest of Technical Papers, 43rd ISSCC, 1996 IEEE, Pub. Date Feb. 8-10, 1996, pp. 178-179, 440.

Martin Wany, et al., "CMOS Image Sensor with NMOS-Only Global Shutter and Enhanced Responsivity," IEEE Transactions on Electron Devices, Pub. Date Jan. 2003, vol. 50, Issue 1, pp. 57-62.

* cited by examiner

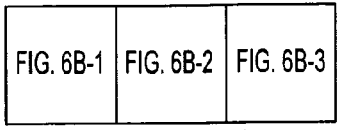
FIG. 6B
FIG. 6B-1
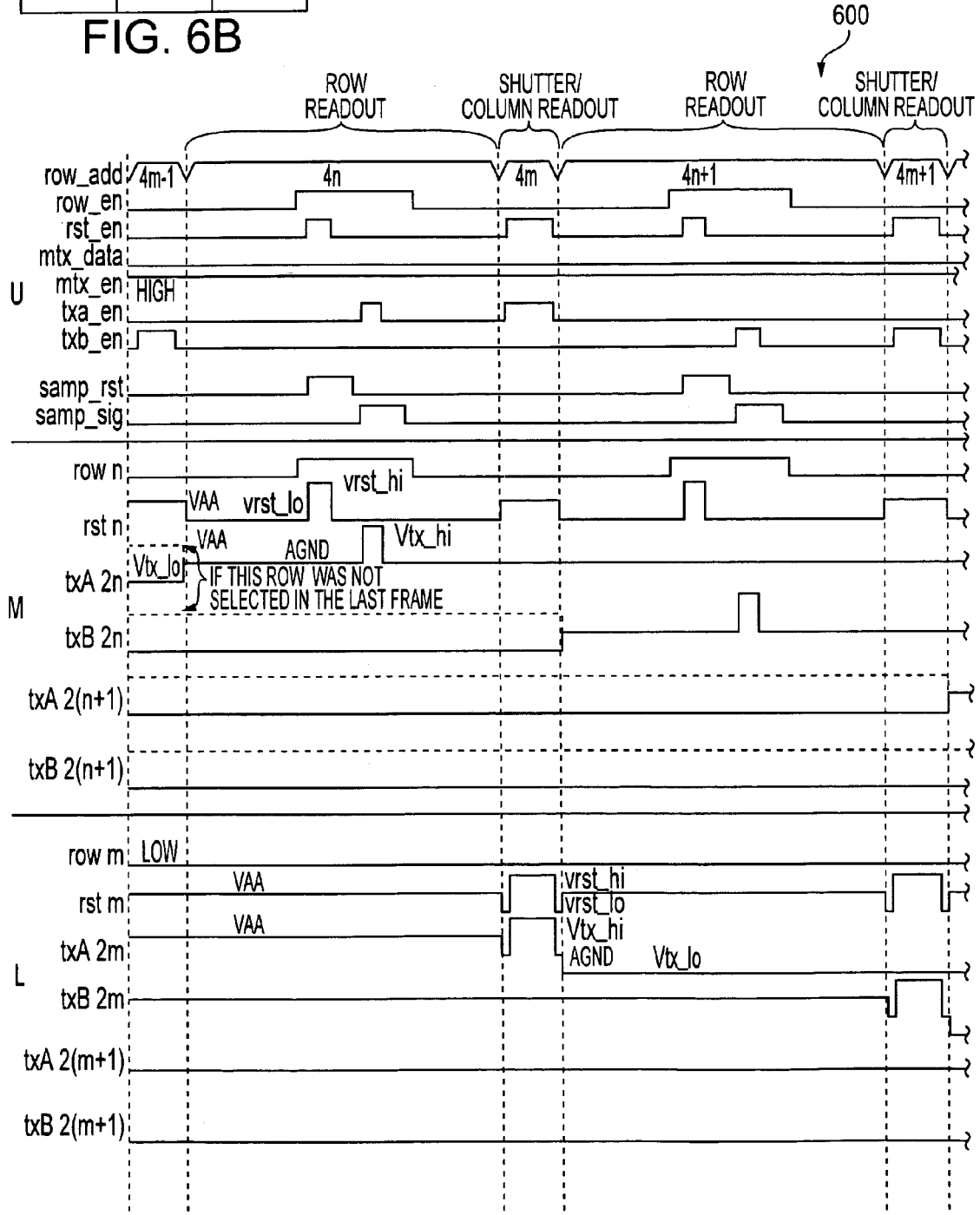

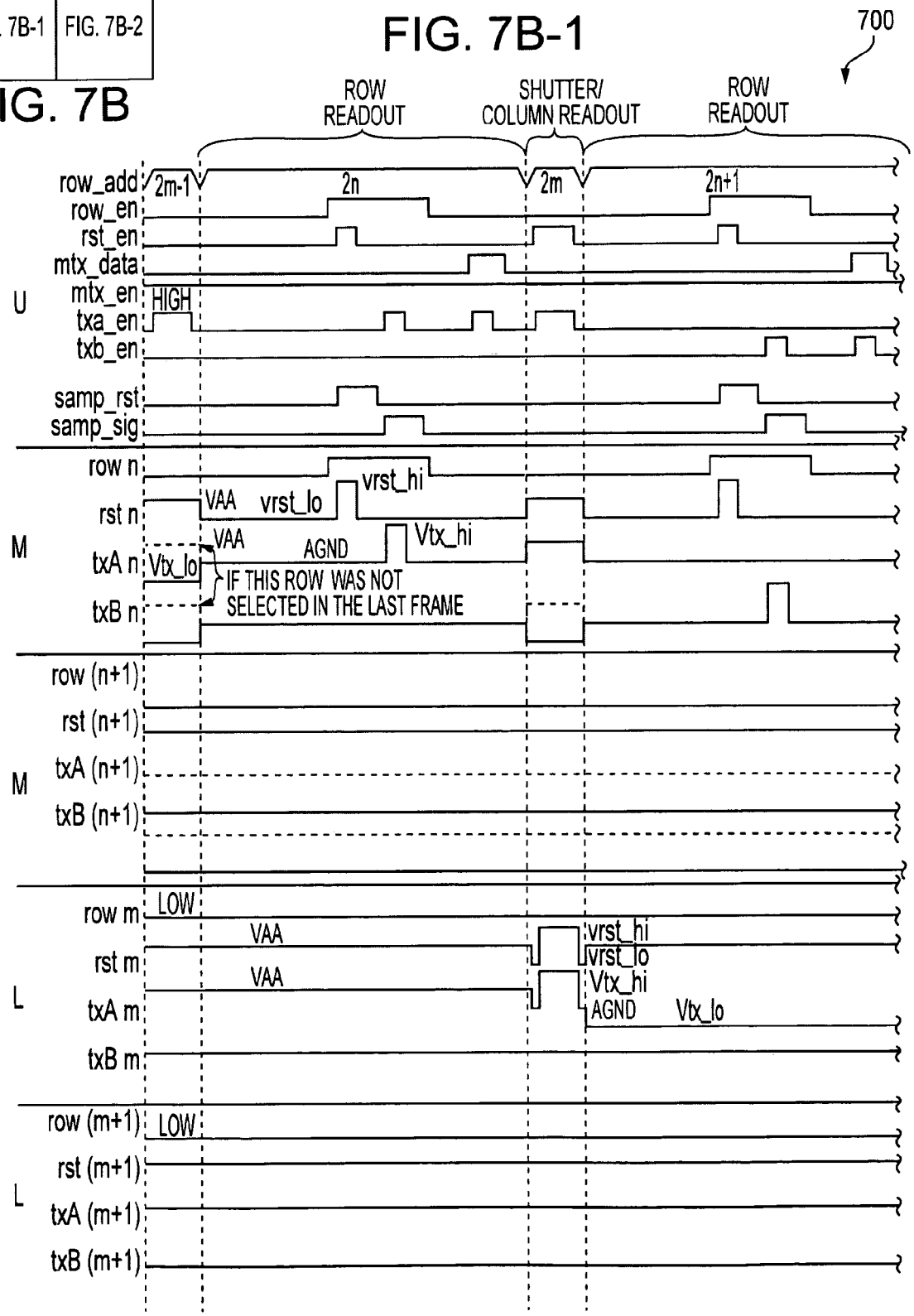

ANTI-BLOOMING PROTECTION OF PIXELS IN A PIXEL ARRAY FOR MULTIPLE SCALING MODES

FIELD OF THE INVENTION

The disclosure relates to circuits and methods for anti-blooming protection for pixels of a pixel array.

BACKGROUND OF THE INVENTION

Many portable electronic devices such as cameras, cellular telephones, personal digital assistants (PDAs), MP3 players, computers and other devices include an imager for capturing images. One example of an imager is a complementary metal-oxide semiconductor ("CMOS") imager. A CMOS imager includes a focal plane array of pixels, each one of the pixels including a photosensor, for example, a photogate, photoconductor or a photodiode overlying a substrate for accumulating photo-generated charge in the underlying portion of the substrate. Each pixel has a readout circuit that includes at least an output field effect transistor and a charge storage region connected to the gate of the output transistor. The charge storage region may be constructed as a floating diffusion region. Each pixel may include at least one electronic device such as a transistor for transferring charge from the photosensor to the storage region and one device, also typically a transistor, for resetting the storage region to a predetermined charge level prior to charge transference, and a row control transistor for selectively connecting the pixel to a column line.

In a CMOS imager, the active elements of a pixel perform the necessary functions of: (1) photon to charge conversion; (2) accumulation of image charge; (3) resetting the storage region to a known state; (4) transfer of charge to the storage region accompanied by charge amplification; (5) selection of a pixel for readout; and (6) output and amplification of a signal representing a reset level and pixel charge. Photo charge may be amplified when the charge moves from the initial charge accumulation region to the storage region. The charge at the storage region is typically converted to a pixel output voltage by a source follower output transistor.

FIG. 1 illustrates a typical four-transistor pixel 50 utilized in a pixel array of an imager, such as a CMOS imager. The pixel 50 includes a photosensor 52 (e.g., photodiode, photogate, etc.), transfer transistor 54, and readout circuit 51. The readout circuit 51 includes a storage node configured as a floating diffusion region N, reset transistor 56, source follower transistor 58 and row select transistor 60. The photosensor 52 is connected to the floating diffusion region N by the transfer transistor 54 when the transfer transistor 54 is activated by transfer control line 53 carrying a transfer control signal TX. The reset transistor 56 is connected between the floating diffusion region N and an array pixel supply voltage $V_{aapix}$. A reset control signal RST supplied over a reset control line 57 is used to activate the reset transistor 56, which resets the floating diffusion region N to a known state as is known in the art.

The source follower transistor 58 has its gate connected to the floating diffusion region N and is connected between the array pixel supply voltage $V_{aapix}$ and the row select transistor 60. The source follower transistor 58 converts the charge stored at the floating diffusion region N into an electrical output signal. The row select transistor 60 is controllable by a row control signal ROW supplied over a row control line 61 for selectively outputting the output signal OUT from the source follower transistor 58 to a sample and hold circuit 46 via column line 45. For each pixel 50, two output signals are conventionally generated, one being a reset signal $V_{rst}$ generated after the floating diffusion region N is reset, the other being an image or photo signal $V_{sig}$ generated after charges are transferred from the photosensor 52 to the floating diffusion region N. Output signals $V_{rst}$, $V_{sig}$ are selectively stored in the sample and hold circuit 46 based on reset and pixel signal sample and hold control signals SHR, SHS.

Pixel 50 is included in one or more pixel arrays for use in an imager. The pixels in a pixel array are arranged in rows and columns, such that each pixel detects the light intensity at the location of that pixel. Each row in the pixel array may include a row driver configured to send a plurality of signals to an identified pixel or row of pixels. The signals generated by the row drivers include row control signals ROW, reset control signals RST and transfer control signals TX, among others. Thus, a row driver includes circuitry for generating, for example, a reset control signal RST or a transfer control signal TX. Such circuitry within the row driver is referred to as a reset row driver or a transfer row driver.

Reset row drivers and transfer row drivers may include boost circuitry that allows for the amplification or boosting of the reset and transfer control signals RST, TX. By boosting the voltage of the reset and transfer control signals at appropriate times, the dynamic range of the imager pixels can be increased without increasing a supply voltage VAA to the imager. Dynamic range refers to the range of incident light that can be sensed by an image sensor in a single frame of pixel data. It is desirable to provide boosted control signals only when necessary, however, in order to reduce the load on the boost circuitry.

Imager row drivers provide the generated control signals to specific pixels at specific times, as determined by a timing and control circuit of the imager. Some imagers utilize a rolling shutter mechanism which affects the timing of the row driver control signals. In a rolling shutter device, a pixel array is incrementally exposed to light from an image, row-by-row. For example, the top or first row in the pixel array may be exposed first to light from an image. Soon thereafter, the second row is exposed, followed by the third row, and so forth. Each pixel row has a same total integration time, but each row begins its integration time (and hence also ends its integration time) at different times. Similarly, the control signals for each row are each issued at different times.

Additional image-obtaining methods may also be used in imagers. For example, various scaling modes may be employed. When every pixel from every row of the pixel array is sampled and used in an image, pixel-by-pixel, the imager is utilizing a full resolution mode. Though full resolution mode results in the highest possible level of detail, other modes may sometimes be used in order to reduce processing times, memory requirements and noise. Skipping mode results in the utilizing of pixels from only some selected rows of the pixel array while other rows are skipped. For example, a pixel array operating in skipping mode may only read out the pixel values of every other row of pixels. In windowing mode, only pixels from a specified block or window of pixels are readout. In binning mode, selected pixel outputs from adjacent rows are summed together and selected outputs from adjacent columns are also summed together. The summed pixel outputs result in an image with fewer numbers of image pixels, but high signal-to-noise ratios.

In addition to providing for the proper timing and operation of the transistors in a pixel for purposes of acquiring and reading-out signals from the imager, the control signals generated by a row driver are also used to bias the transistor gates to protect the pixel from the effects of blooming. Blooming occurs when the amount of charge generated at a pixel exceeds the storage capacity of the pixel and the excess charge overflows into neighboring pixels. This may occur if the integration period is too long or the light incident on the pixel is too bright. One way to protect against blooming is to bias the transfer and reset transistors in a pixel so that the photosensor and floating diffusion region are drained of excess charge.

Unfortunately, the effectiveness of using this bias method to provide anti-blooming protection has been limited by the scaling and operating mode of the imager. For example, when an imager is operating in skipping or windowing mode, anti-bloom methods have not provided anti-bloom draining to skipped rows. Consequently, pixels in skipped rows have acquired charges that have leaked from other pixels, and no provision for the draining of these charges is provided since these pixels are not expected to integrate or acquire any charge. Should the photosensor or floating diffusion region of these skipped pixels overflow, neighboring integrating pixels are affected. Additionally, in four-way shared pixels, wherein pixels that are on different rows share a floating diffusion region, the accumulation of excess unwanted charge in a floating diffusion region of a pixel in a skipped row can contaminate the photo-generated charge accumulated by a selected row. Thus, there is a need to provide anti-blooming protection to skipped rows when an imager operates in skipping or windowing mode.

For similar reasons, there is a need to provide anti-blooming biasing to more than just a localized region of the pixel array when an imager is utilizing a rolling shutter. By applying only localized anti-blooming protection during a rolling shutter, neighboring, non-protected pixel rows can acquire excess unwanted charges and then contaminate other pixel rows.

DETAILED DESCRIPTION OF THE INVENTION

Embodiments described herein turn on the transfer and reset transistors during a non-integration period to drain excess unwanted charges. The transfer and reset row drivers can also be operated so that during an integration period, the floating diffusion region voltage can be maintained at a relatively low voltage so as to reduce dark current. A negative transfer low voltage can be applied to transfer transistors during integration periods to also reduce dark current. Transistors can be fully turned on via the use of boosted control signals when necessary to more completely drain or readout the photosensors or floating diffusion regions.

Embodiments disclosed herein can provide an improved anti-blooming design for imager row drivers and boosters which may obtain the following benefits, among others. First, for an imager operating in skipping mode, all skipped rows can be provided with anti-blooming protection. In this way, skipped rows are not likely to be corrupted by blooming which then can affect integrating or shared pixels. This can be done through a global anti-blooming operation applied in a global manner. Anti-blooming control signals can be sent to reset and transfer transistors, generally for rows that are not selected for readout and that are not integrating. In order to reduce hot pixel or dark current problems, the anti-blooming control signals can be limited to the level of a supply voltage VAA. Additionally, during integration, a negative transfer low voltage Vtx_lo can be used for the transfer transistors and a non-boosted reset control signal (the supply voltage VAA) can be used to allow the floating diffusion region to drain while not extensively contributing to the induction of dark current.

Second, transfer and reset control signals can be boosted to a transfer high voltage Vtx_hi and reset high voltage Vrst_hi, respectively, during the sampling and shutter phases of imager operation to more fully transfer any accumulated charge from either the photosensor or the floating diffusion region. The shutter phase occurs just before a pixel integration phase. Although transfer and reset control signals could be boosted even more frequently, by boosting only during sampling and shutter phases, booster load, power consumption and dark current are reduced.

Embodiments disclosed herein also include an ability by the row driver to vary its output according to whether the row driven by the row driver is a non-selected non-integrating row and a non-selected integrating row. This ability is made possible by utilizing a latch circuit in the row driver. The improved design can be implemented with each of these benefits, individually or combined.

Figure 1:
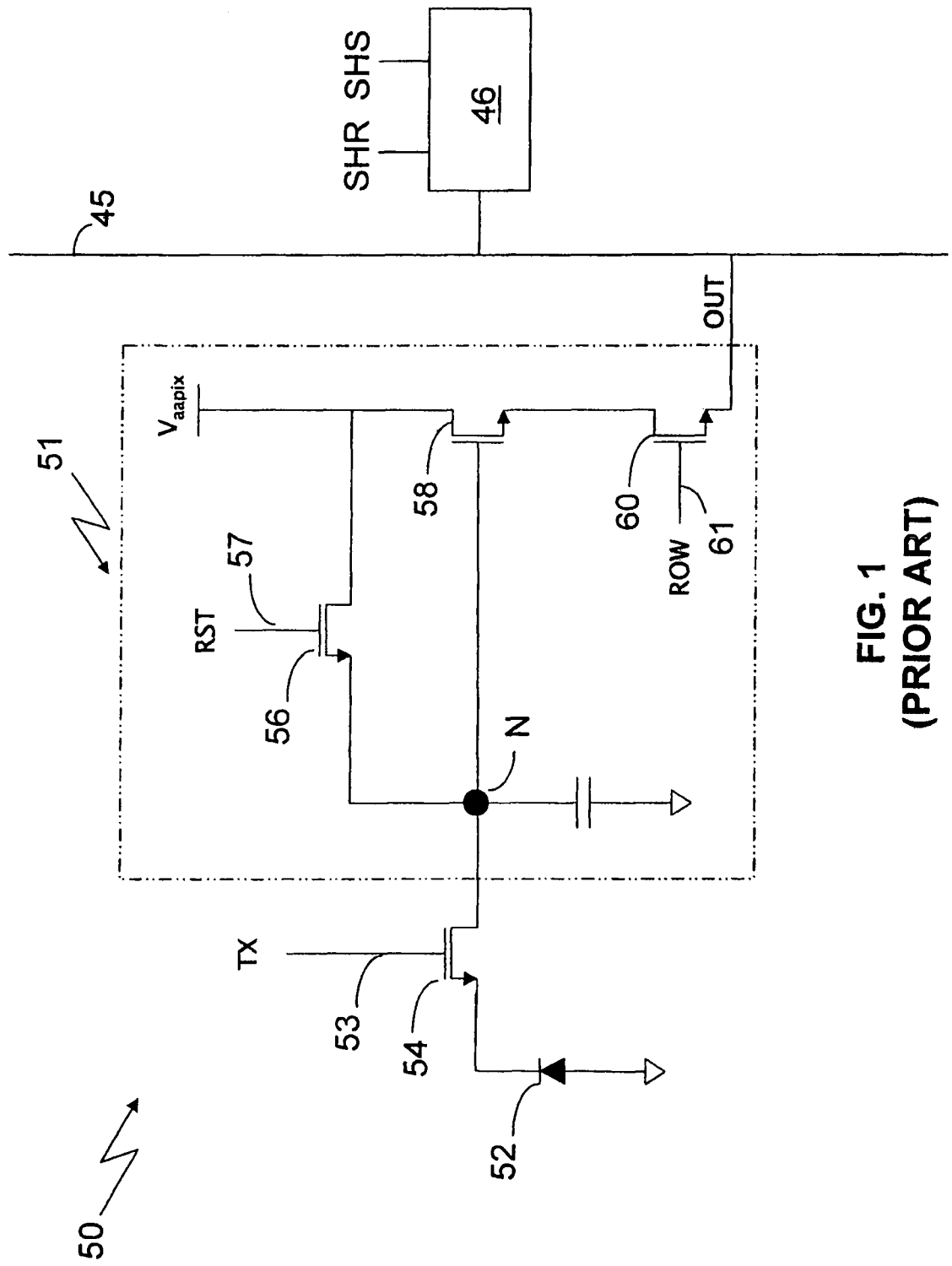
FIG. 1 is a schematic diagram of a conventional four-transistor pixel.
Figure 2:
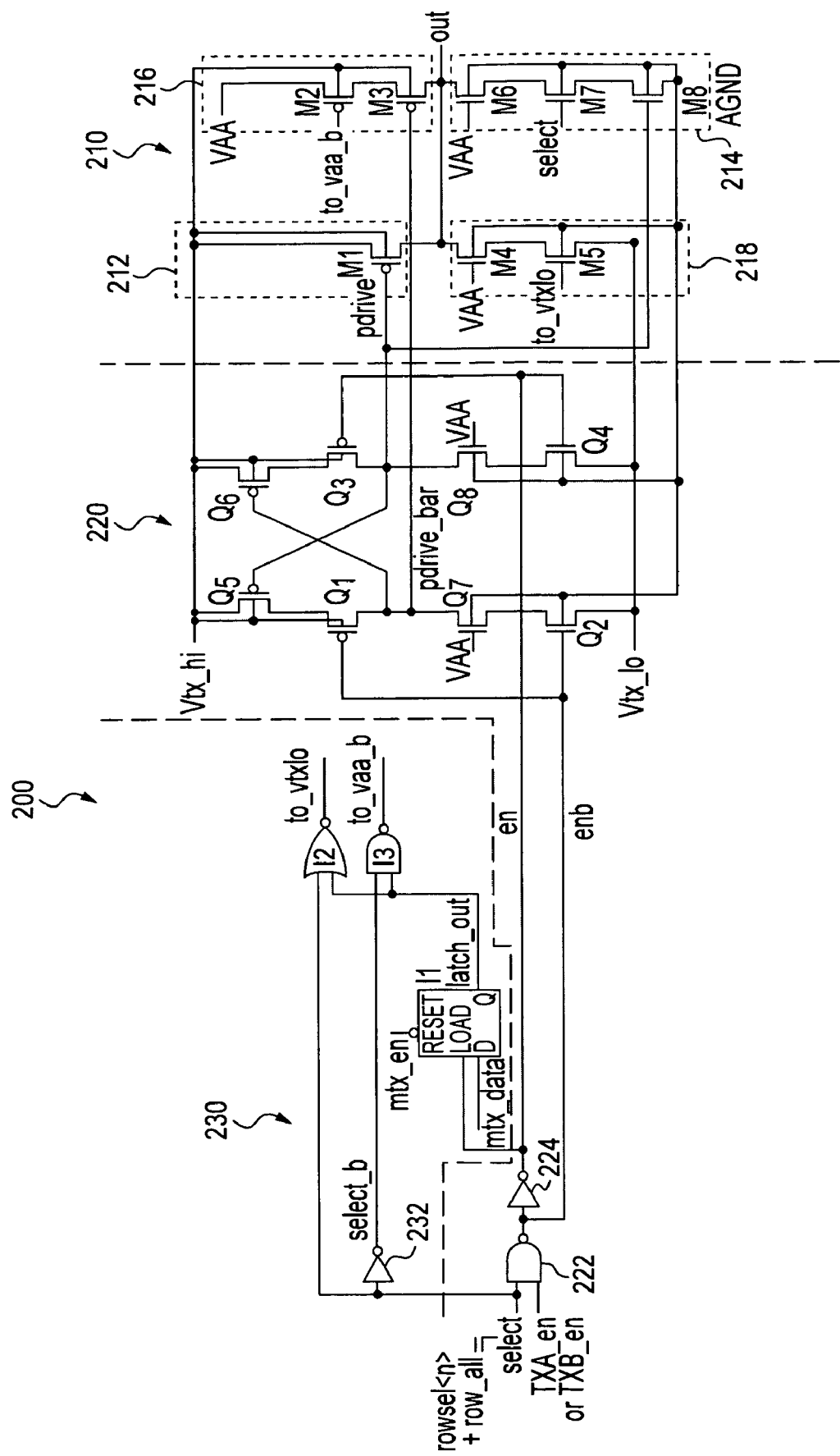
FIG. 2 is a schematic diagram of a TX row driver, according to the disclosed embodiments.

A first embodiment of a transfer signal TX row driver 200 is illustrated in FIG. 2. If the TX row driver 200 is applied to a row selected for readout, the transfer gates flip between a boosted transfer high voltage Vtx_hi and a ground voltage AGND, where the transfer high voltage Vtx_hi is the output voltage from a transfer high voltage booster. If the driver 200 is applied to a row that is not selected for readout, but is in integration, the pixel transfer gates are connected to the negative transfer low voltage Vtx_lo, the output voltage from a transfer low booster. If the driver 200 is applied to a row not selected for readout that is not in integration, the pixel transfer gates are connected to various voltages depending on whether the photodiode anti-blooming function is enabled. If the photodiode anti-blooming function is enabled, the transfer gates are connected to the supply voltage VAA for a photodiode flush when the reset control voltage is also at the supply voltage VAA. If the photodiode anti-blooming function is not enabled, the transfer gates are connected to the negative transfer low voltage Vtx_lo.

The TX row driver 200 includes an output stage 210, a boosted control voltage stage 220 and a latch logic stage 230. The output stage 210 includes four branches 212, 214, 216, 218, with the branches being respectively connected to the transfer high voltage Vtx_hi, the ground voltage AGND, the supply voltage VAA, and the negative transfer low voltage Vtx_lo.

The boosted control voltage stage 220 includes transistors Q1-Q8. The inputs to the boosted control voltage stage 220 are a transfer enable signal TXA_en or TXB_en and a row control signal select which are supplied to NAND gate 222. The transfer enable signal TXA_en is applied to even-numbered rows in the pixel array. The transfer enable signal TXB_en is applied to odd-numbered rows in the pixel array. The row control signal select is high when either a global row enable signal row_all is high or a local row enable signal rowsel<n> is high. Enable signal complement enb arises from a NAND 222 operation on the transfer enable signal TXA_en (or TXB_en) and the row control signal select. An inverter 224 is used to invert the enable signal complement enb to a signal en. The boosted control voltage stage 220 also includes a boosted voltage supply in the form of a transfer high voltage Vtx_hi, a low voltage source in the form of a negative transfer low voltage Vtx_lo, and a boosted control voltage stage output signal pdrive and its complement pdrive_bar. Transistors Q1, Q3, Q5, Q6 are p-channel metal oxide semiconductor (PMOS) transistors. Transistors Q2, Q4, Q7, Q8 are n-channel metal oxide semiconductor (NMOS) transistors. Transistors Q7, Q8 are gated to the supply voltage VAA and serve to protect transistors Q2, Q4 from potentially high voltages at the boosted control voltage stage output signals pdrive and pdrive_bar. When the result of NAND 222 is low (i.e., when both TXA_en or TXB_en and select are high), NMOS transistor Q4 is activated and boosted control voltage stage output signal pdrive is also brought to the negative transfer low voltage Vtx_lo. When the result of NAND 222 is high (i.e., TXA_en (or TXB_en) and select are low), the boosted control voltage stage output signal pdrive is raised to the boosted transfer high voltage Vtx_hi.

The output stage 210 includes four branches 212, 214, 216, 218 and is designed so that the TX row driver 200 may output one of four voltages that correspond with the four branches 212, 214, 216, 218. The branch 212 connected to the boosted transfer high voltage Vtx_hi includes a PMOS transistor M1 which connects an "out" node to the transfer high voltage Vtx_hi when the boosted control voltage stage output signal pdrive is low. As explained above, this occurs when the transfer enable signal TXA_en (or TXB_en) and the row control signal select are high. This means that the output of the TX row driver 200 is the transfer high voltage Vtx_hi when the specific row controlled by the row driver 200 is selected and the TX signal is enabled. This corresponds to an activation of all transfer transistors in the selected row, causing each pixel in the selected row to transfer charge to the pixel floating diffusion region.

The TX row driver 200 outputs a ground voltage AGND when the output branch 214 connected to ground AGND is activated. The branch 214 connected to ground AGND includes three NMOS transistors M6, M7, M8. The gate of transistor M6 is connected to the supply voltage VAA and is used to protect transistors M7, M8 from possible high voltage at the "out" node. Optionally, transistor M6 could be omitted so that transistor M7 is the protective transistor, since high voltage at the "out" node only happens when "select," the gate input to transistor M7, is high. Transistors M7, M8, when activated, connect the "out" node to ground AGND. This occurs when both the row control signal select and the boosted control voltage stage output signal pdrive are high. This is the result of the row control signal select being high, meaning that the row has been selected, and the TX signal has been disabled (i.e., TXA_en or TXB_en is low).

Transistor M8 is deliberately controlled by the generated output signal pdrive instead of the enable signal complement enb. Because both transistors M8 and M1 are controlled by the generated output signal pdrive, the circuit 200 is prevented from developing a momentary short path between the transfer high voltage Vtx_hi and the ground voltage AGND during the falling edge of the transfer enable signal TXA_en (or TXB_en).

The output branches 216, 218 connected to the supply voltage VAA and the negative transfer low voltage Vtx_lo, respectively, are controlled by various outputs of the latch logic stage 230. For these branches, the latch output latch_out is utilized. Latch I1 accepts as a clock input the enable signal en, which is the complement of the output of the NAND 222 operation on the row control signal select and the TX enable signals TXA_en or TXB_en. When the enable signal en is high, the latch I1 passes (with a small delay) the value of a transfer data signal mtx_data to the latch output latch_out. The latch I1 works as long as the latch enable signal mtx_en is high (it only outputs a low if the latch enable signal mtx_en is low). In general, if the enable signal en is high and the transfer data signal mtx_data is high, then when the row control signal select turns low, the output of the TX row driver 200 is the supply voltage VAA. On the other hand, if the enable signal en is high and the transfer data signal mtx_data is low, then when the row control signal select turns low, the output of the TX row driver 200 is the transfer low voltage Vtx_lo. In this way, the transfer data signal mtx_data indicates whether the row controlled by the TX row driver 200 is integrating or non-integrating. The latch logic stage 230 also includes NOT gate 12, NAND gate 13 and inverter 232.

The supply voltage VAA branch 216 is activated (meaning that the "out" node of the TX row driver 200 is connected to the supply voltage VAA) when PMOS transistors M2, M3 are turned on. Transistor M2 is turned on when latch logic output signal to_vaa_b is low. This occurs when the row control signal select is low and the latch output latch_out is high. This corresponds to an unselected non-integrating row. Transistor M3 is turned on when the boosted control voltage stage output signal pdrive_bar is low, meaning that at least one of the row control signal select and the enable signals TXA_en (or TXB_en) are low. By using the signal pdrive_bar to control transistor M3, there is no leakage between the supply voltage VAA and the "out" node when the "out" node is at the level of transfer high voltage Vtx_hi, which happens when pdrive_bar is high. Here, the supply voltage VAA only flows to the "out" node if the signal pdrive_bar is low. Additionally, before any row of an imager is integrating (e.g., when the imager is initialized), the transfer gates of all pixel rows are set at the supply voltage VAA. This is done by pulsing the signals row_all, mtx_data, TXA_en and TXB_en high simultaneously.

The transfer low voltage Vtx_lo branch 218 is activated (meaning that the "out" node of the TX row driver 200 is connected to the transfer low voltage Vtx_lo) when NMOS transistor M5 is turned on. This occurs when logic output signal to_vtxlo is high, which happens when both the row control signal select and the latch output latch_out are low. The situation wherein the row control signal select is low and the latch output latch_out is low corresponds to an unselected integrating row. NMOS transistor M4 in the Vtx_lo branch 218 is gated by VAA and acts as a protective device to protect transistor M5 from high voltage.

Anti-blooming protection of unselected rows occurs by maintaining the gate voltage of transfer transistors in pixels of unselected non-integrating rows at the supply voltage VAA. As explained above, this occurs when the row control signal select is low and the latch output latch_out is high. However, this anti-blooming feature may be disabled by simply clamping the latch I1 to a low output. Latch clamping is performed via the latch enable signal mtx_en. If the latch output latch_out were always maintained low, then transfer transistor control voltages for pixels in unselected rows would be maintained at the negative transfer low voltage Vtx_lo, regardless of whether the pixels were integrating. Thus, disabling the anti-blooming function in the TX row driver 200 is as simple as disabling the latch I1 by making the latch enable signal mtx_en low.

Figure 3:
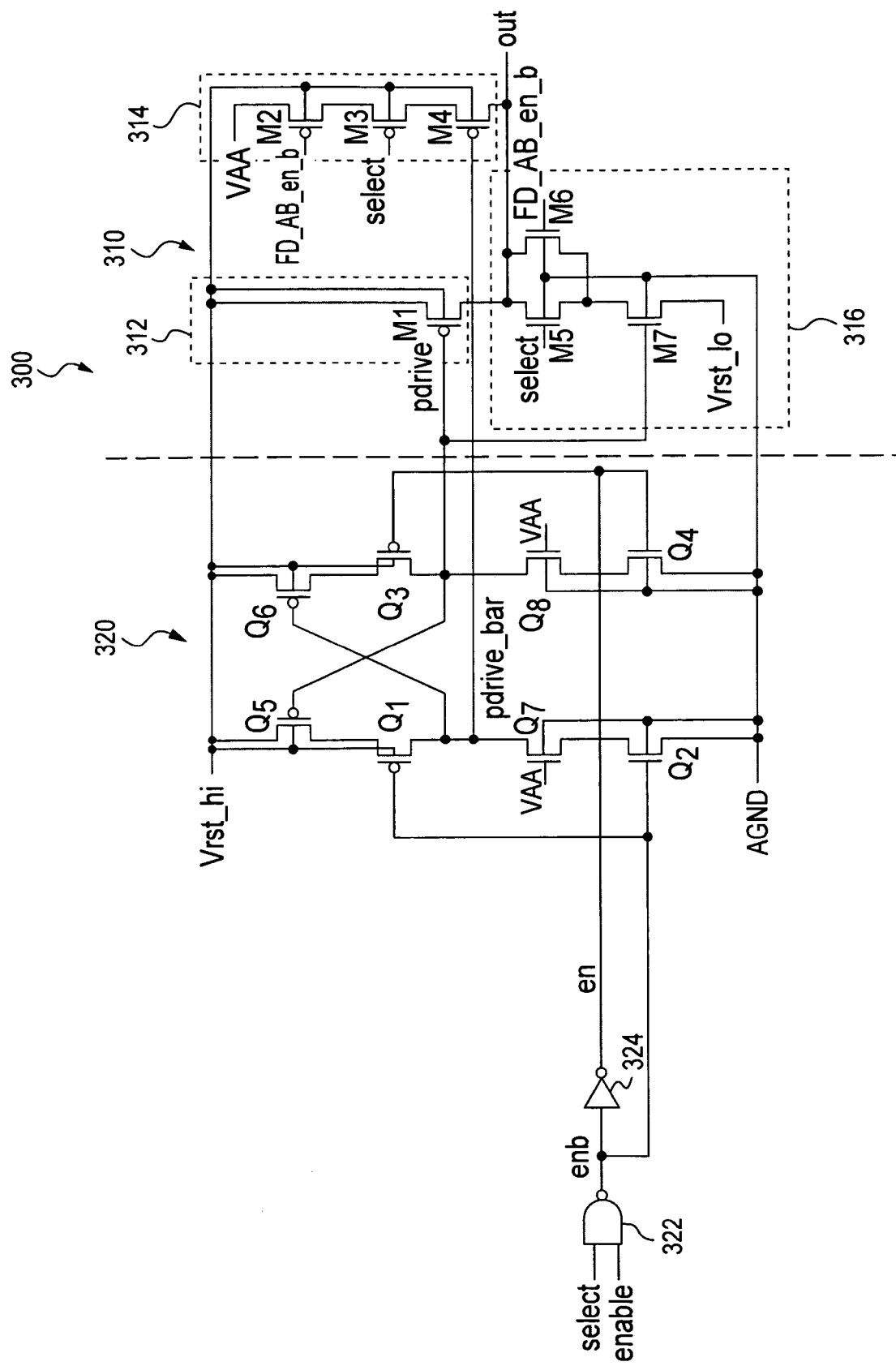
FIG. 3 is a schematic diagram of a RST row driver, according to the disclosed embodiments.

FIG. 3 illustrates a RST row driver 300, in accordance with the disclosed embodiments. If the driver output RST is applied to a row selected for readout, the reset gates flip between a reset high voltage Vrst_hi and a reset low voltage Vrst_lo from reset high/low voltage boosters respectively. If the driver 300 is applied to a row that is not selected for readout, the reset gates are connected to various voltages depending on whether the floating diffusion anti-blooming function is enabled. If the floating diffusion anti-bloom function is enabled, the reset gates are connected to a supply voltage VAA that allows the flushing of the floating diffusion region through the reset transistor. If the floating diffusion anti-blooming function is not enabled, the reset gates are connected to the reset low voltage Vrst_lo.

The RST row driver 300 includes an output stage 310 and a boosted control voltage stage 320. The boosted control voltage stage 320 of the RST row driver 300 is the same as the boosted control voltage stage of the TX row driver 200, although the input and output signals are different. The output stage 310 includes three branches 312, 314, 316, with each branch being respectively connected to the reset high voltage Vrst_hi, the supply voltage VAA, and the reset low voltage $V_{rst}$_lo.

The boosted control voltage stage 320 includes transistors Q1-Q8. The inputs to the boosted control voltage stage 320 are a reset enable signal enable and a row control signal select. Enable signal complement enb arises from the result of a NAND 322 operation on the input signals enable and select. An inverter 324 is used to invert the enable signal complement enb to signal en. The voltage sources include a boosted voltage supply in the form of a reset high voltage Vrst_hi and a ground voltage AGND. The output signals include the boosted control voltage stage output signal pdrive and its complement pdrive_bar. When the result of NAND 322 is low (i.e., when both enable and select are high), boosted control voltage stage output signal pdrive is brought to ground AGND. When the result of NAND 322 is high (i.e., when at least one of enable and select are low), the boosted control voltage stage output signal pdrive is raised to the reset high voltage Vrst_hi.

The output stage 310 includes three branches 312, 314, 316 and is designed so that the RST row driver 300 may output one of three voltages that correspond with the three branches 312, 314, 316. Branch 312 connected to the reset high voltage Vrst_hi includes a PMOS transistor M1 which connects an "out" node to the reset high voltage Vrst_hi when the boosted control voltage stage output signal pdrive is low. As explained above, this occurs when both the reset enable signal enable and the row control signal select are high. This means that the output of the RST row driver 300 is the reset high voltage Vrst_hi when the specific row controlled by the row driver 300 is selected and the RST signal is enabled. This corresponds to an activation of all reset transistors in the selected row, causing each pixel in the selected row to reset the pixel floating diffusion regions to a pixel array voltage VAAPIX.

The RST row driver 300 outputs the supply voltage VAA when PMOS transistors M2, M3, M4 in the supply voltage VAA branch 314 are activated. Transistor M4 is activated when the boosted control voltage stage output signal pdrive_bar is low. Transistor M4 prevents the formation of a leakage path between the supply voltage VAA and the "out" node which is at the level of the reset high voltage Vrst_hi when both the select and RST_en signals are high. Transistor M3 is activated when the row control signal select is low. Thus, transistors M3, M4 are activated when the row has not been selected, regardless of whether the reset transistors in the row have been enabled. Transistor M2 is added to allow the enabling of floating diffusion region anti-blooming to the circuitry. If floating diffusion region anti-blooming is enabled, the signal FD_AB_en_b becomes low and transistor M2 is activated. This results in the reset transistors of the pixels in the unselected pixel rows being gated at the supply voltage VAA, which allows the floating diffusion regions to be flushed. Thus, to protect against blooming, non-selected rows are biased at the supply voltage VAA.

The RST row driver 300 outputs the reset low voltage Vrst_lo when NMOS transistors M5, M6, M7 are activated (output branch 316). Transistor M7 is activated when the boosted control voltage stage output signal pdrive is high. Transistor M5 is activated when the row control signal select is high. Thus, transistors M5, M7 are activated when the row has been selected and the reset transistors in the row have been turned off. The RST row driver 300 also outputs the reset low voltage Vrst_lo when the floating diffusion region anti-blooming signal has been disabled (meaning that anti-blooming signal FD_AB_en_b is high), thereby activating transistor M6, and the boosted control voltage stage output signal pdrive is high, meaning that the row is either not selected or not reset enabled, or both.

Transistors M2, M6 allow for the independent enablement or disablement of floating diffusion region anti-blooming for the pixels. In addition, by controlling transistor M7 using the boosted control voltage stage output signal pdrive instead of the signal enb, a potential short between the reset high voltage Vrst_hi and the reset low voltage Vrst_lo during the falling edge of the enable signal is avoided.

Although the RST row driver 300 of FIG. 3 is generally sufficient for most pixels, certain more complicated pixels such as, for example, five-transistor high-dynamic range ("5T HDR") pixels, may require RST row drivers that are capable of distinguishing between integrating and non-integrating rows (a capability demonstrated by the TX row driver 200 of FIG. 2). This capability is enabled by using a latch logic stage identical to the latch logic stage used in the TX row driver 200 of FIG. 2, as illustrated in FIG. 4.

Figure 4:
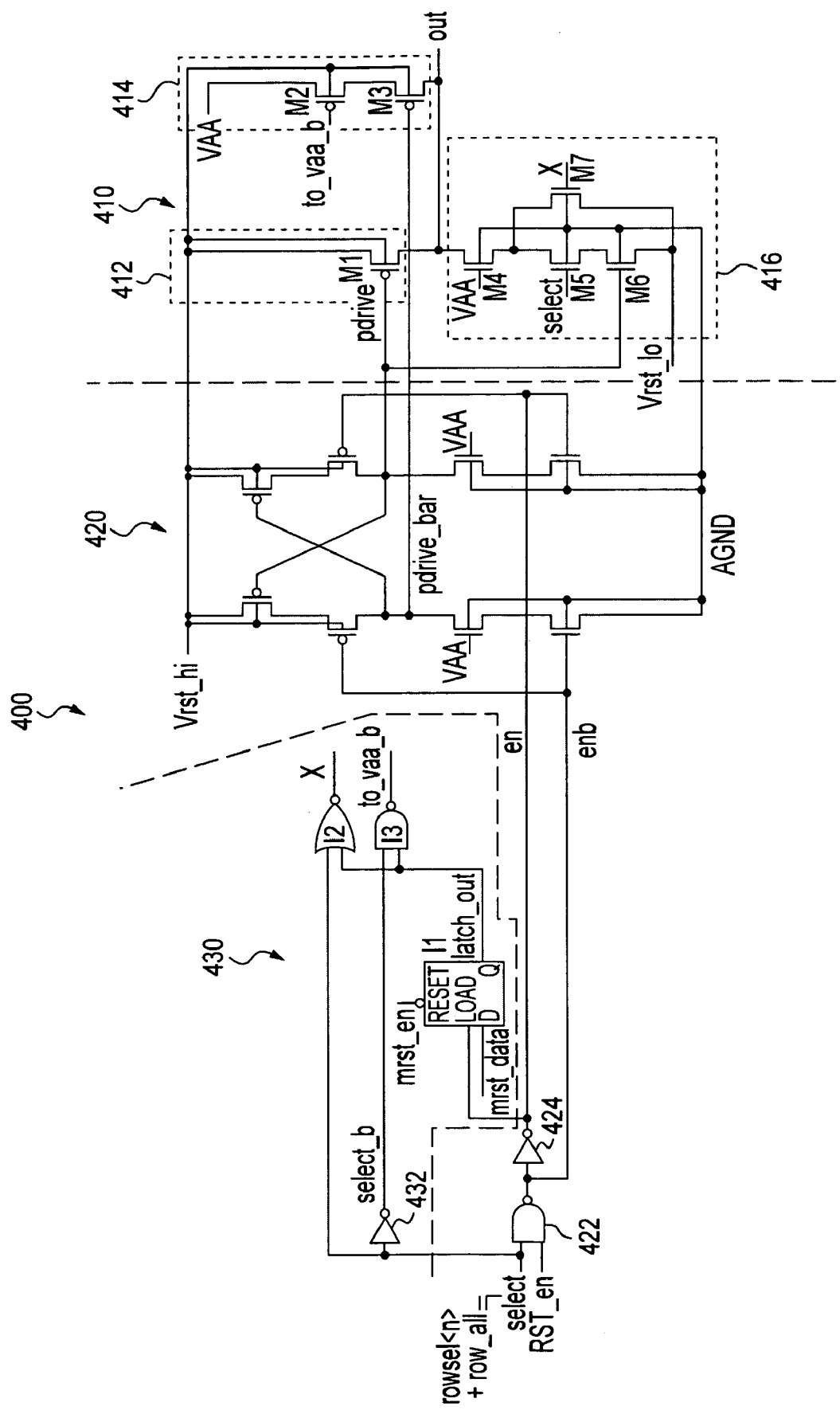
FIG. 4 is a schematic diagram of a RST row driver, according to the disclosed embodiments.
Figure 5A:
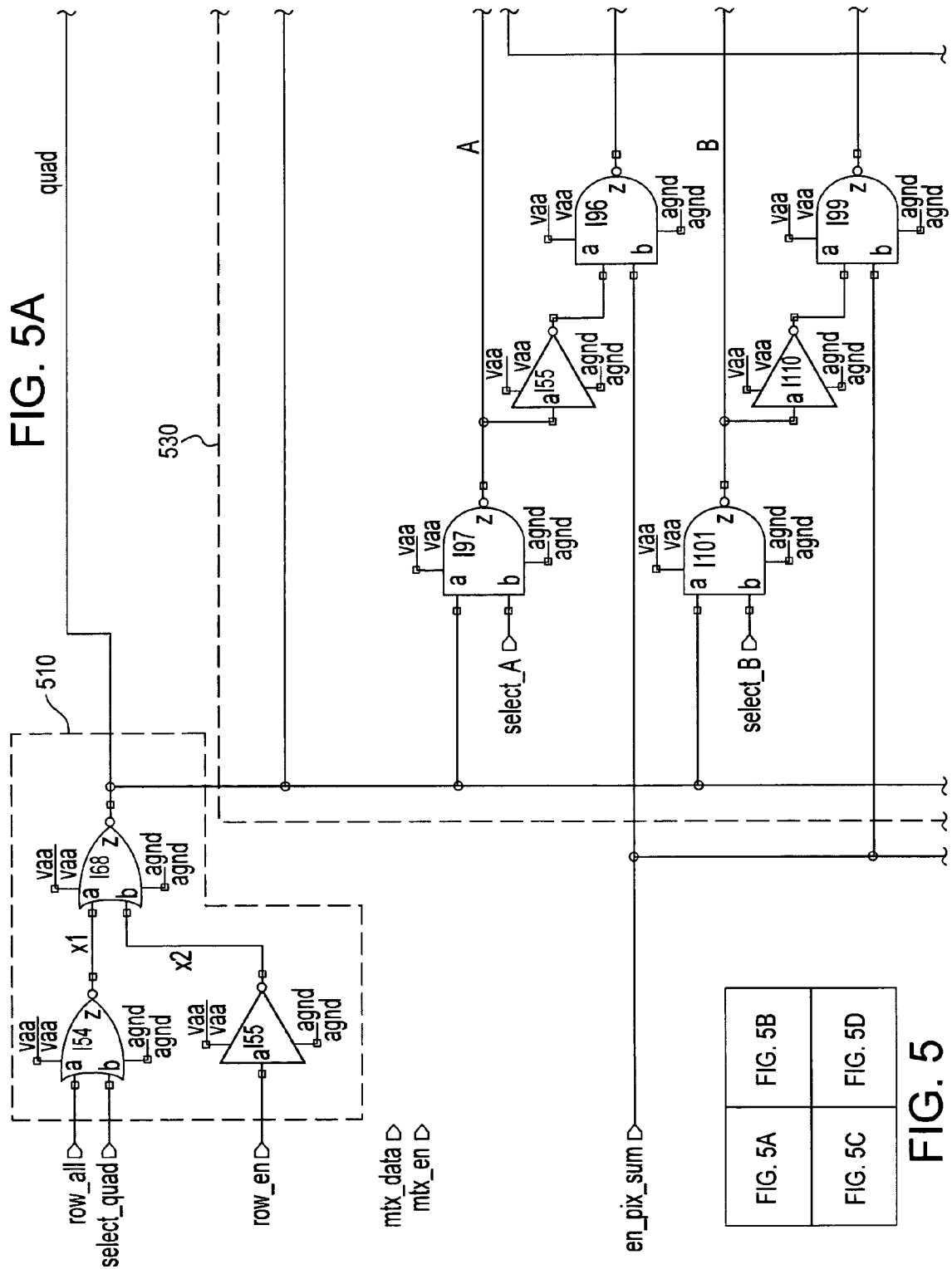
FIG. 5 is a schematic diagram of a row driver unit, according to the disclosed embodiments.
Figure 5B:
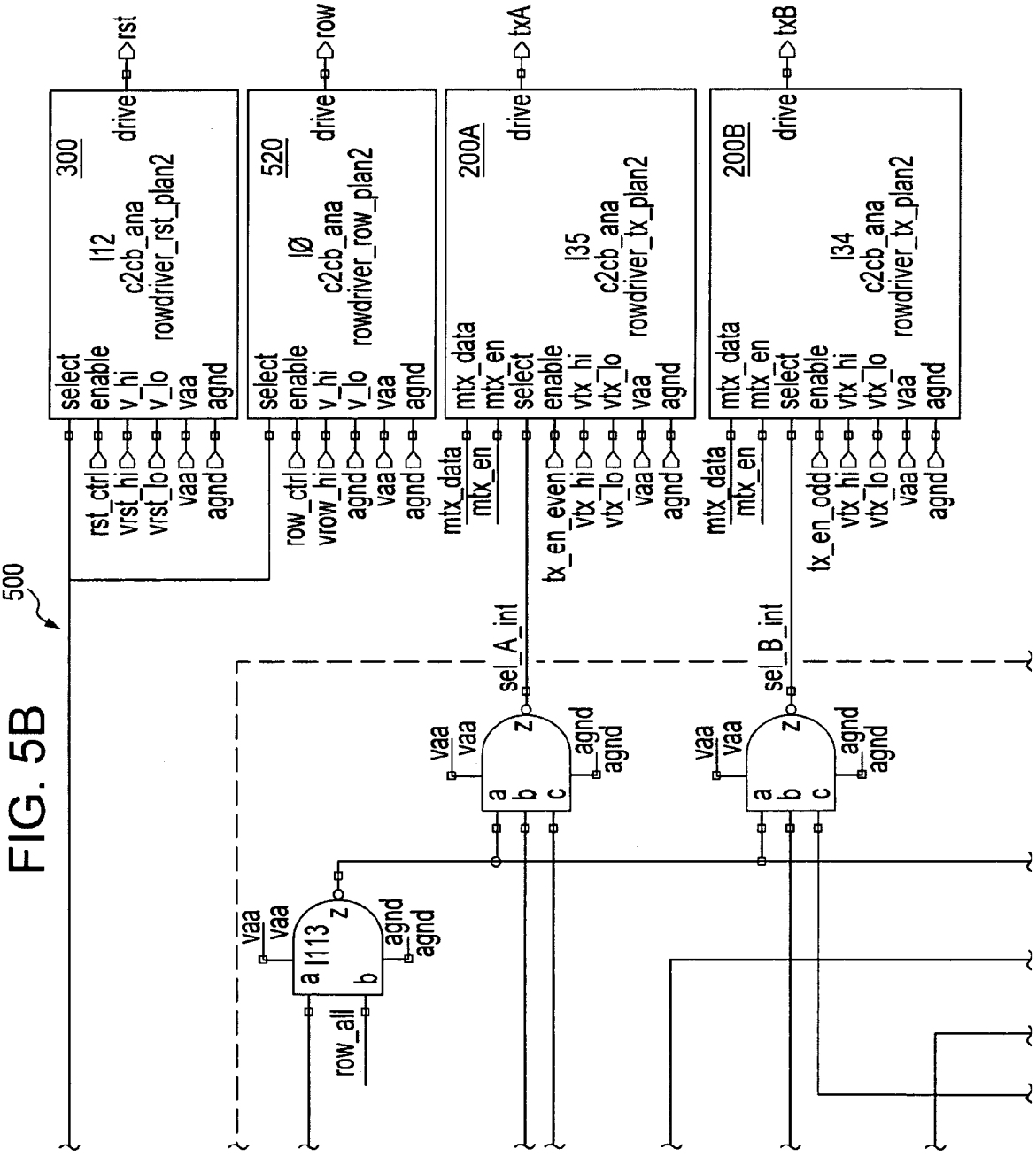
Figure 5C:
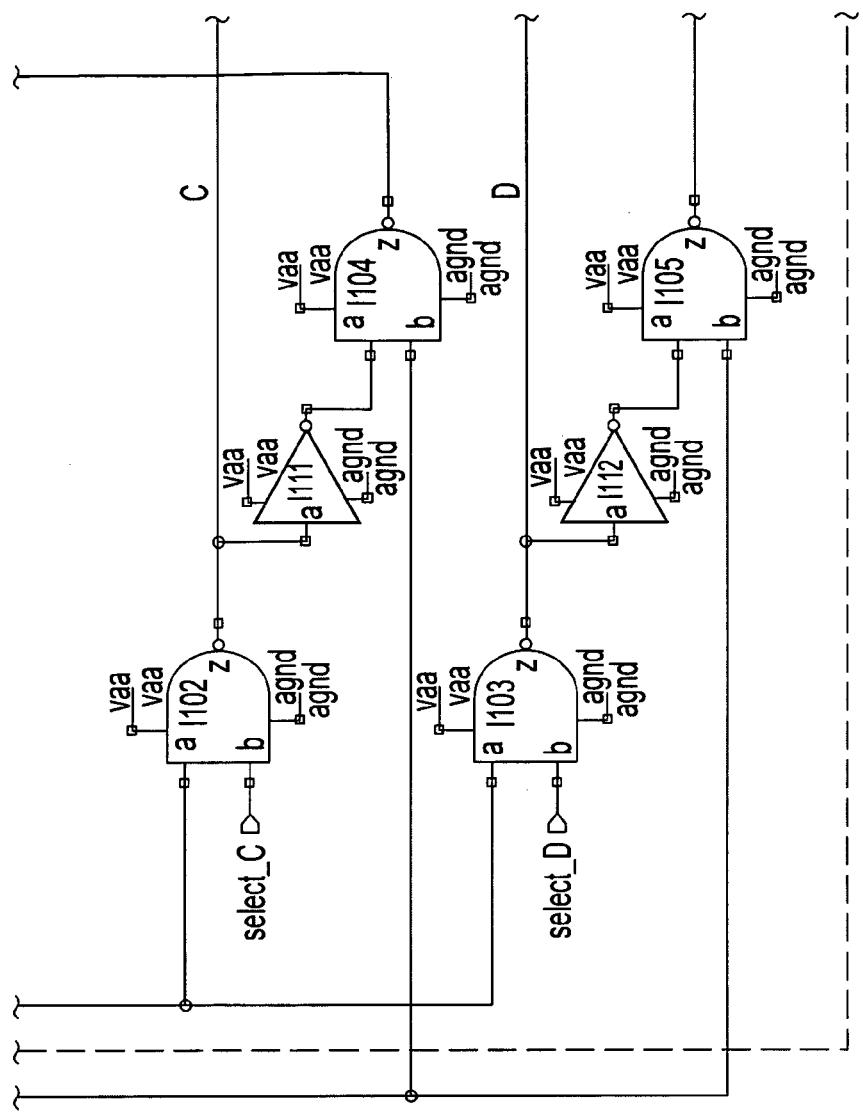
Figure 5D:
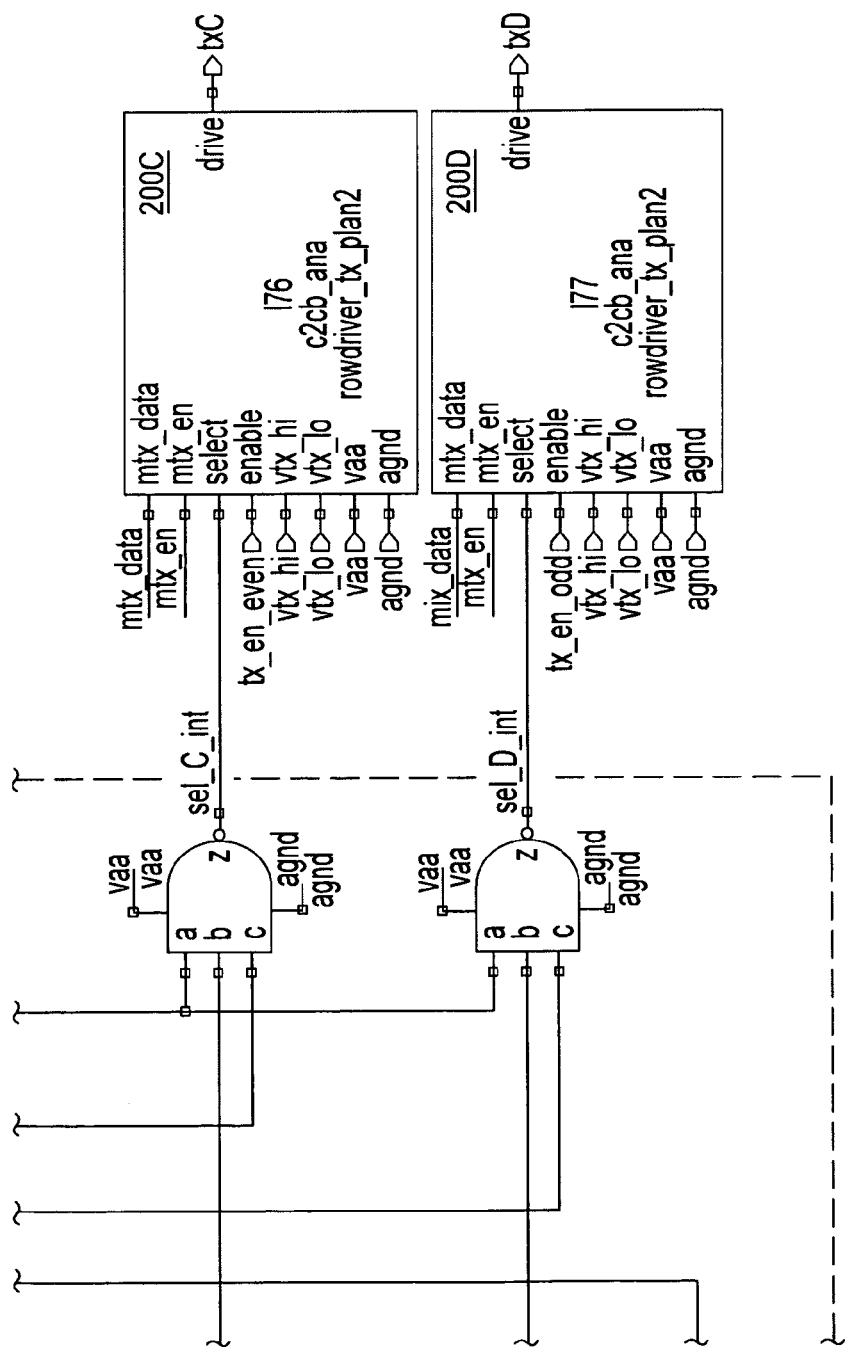

FIG. 4 illustrates a RST row driver 400 with a latch logic stage 430, a boosted control voltage stage 420 and an output stage 410. The latch logic stage 430 is identical to the latch logic stage 230 of the TX row driver 200 (of FIG. 2). The boosted control voltage stage 420 is also the same as the boosted control voltage stages 220, 320 in the row drivers 200, 300 of FIGS. 2 and 3, except that the inputs are now the reset enable signal RST_en and the row control signal select, which is high when either the rowsel<n> or row_all signals are high. The output stage includes three output branches 412, 414, 416, one each for respectively connecting the "out" node to the reset high voltage Vrst_hi, the supply voltage VAA, and the reset low voltage Vrst_lo. The reset high voltage Vrst_hi branch 412 of FIG. 4 is identical to the reset high voltage Vrst_hi branch 312 of FIG. 3. The "out" node is connected to the reset high voltage Vrst_hi when both the specific row is selected and when the reset transistors have been enabled.

The supply voltage VAA branch 414 includes PMOS transistors M2, M3. Transistor M3 is gated by the boosted control voltage output signal pdrive_bar and is activated whenever transistor M1 of the reset high voltage Vrst_hi branch is not activated. By using pdrive_bar to gate transistor M3, any leakage that could occur between the supply voltage VAA and the "out" node when the "out" node is at the reset high voltage Vrst_hi is avoided. Transistor M2 of the supply voltage VAA branch is activated whenever the signal to_vaa_b from the latch logic stage is low. This occurs when the row control signal select is low and the latch output latch_out is high. This indicates an unselected non-integrating row.

The RST row driver 400 outputs the reset low voltage Vrst_lo when NMOS transistors M4, M5, M6, M7 are activated (output branch 416). Transistor M4 is a protective device and is used to protect the other transistors M5, M6, M7 from high voltage at the "out" node. Transistors M5, M6 are activated when both the row control signal select and the boosted control voltage output signal pdrive are high. This corresponds to when the row is selected and the reset transistors have been disabled. Transistor M7 is gated by the signal X from the latch logic stage 430 and is activated when signal X is high. Signal X is high when the row control signal select is low and the latch output signal latch_out is low. This situation corresponds to an unselected integrating row.

Anti-blooming protection of unselected rows occurs by maintaining the gate voltage of reset transistors in pixels of unselected, non-integrating rows at the supply voltage VAA. As explained above, this occurs when the row control signal select is low and the latch output latch_out is high. However, this anti-blooming feature may be disabled by simply clamping the latch I1 to a low output. Latch clamping is performed via the latch enable signal mrst_en. If the latch output latch_out were always maintained as low, then reset transistor control voltages for pixels in unselected rows would be maintained at the transfer low voltage Vrst_lo, regardless of whether the pixels were integrating. Thus, disabling the anti-blooming function in the RST row driver 400 is as simple as making the latch enable signal mrst_en low.

TABLE 1

Signal outputs for TX and RST row drivers 200, 300, 400 when anti-blooming is enabled.

| Row Type | Operational Phase | TX Row Driver Output | RST Row Driver Output |
|---|---|---|---|
| Unselected Row | No integration | VAA | VAA |
|  | Integration | Vtx_lo | VAA |
| Selected Row | Reset sampling | AGND | Vrst_hi |
|  | Signal sampling | Vtx_hi | Vrst_lo |
|  | Shutter phase | Vtx_hi | Vrst_hi |

A summary of the signal output values of the RST and TX row drivers 200, 300, 400 of FIGS. 2-4 is presented in Table 1 above. Table 1 is organized to show the RST and TX row driver outputs for unselected and selected rows in a pixel array, for various phases of operation. For an unselected row that is not in integration, the TX row driver 200 outputs a non-boosted supply voltage VAA. The RST row drivers 300, 400 also output a supply voltage VAA for unselected rows not in integration. Thus, when a row is unselected and not in integration, the photosensor and floating diffusion region are drained of any accumulated charge.

For a row that is about to enter integration phase and is in the shutter phase, the TX row driver 200 outputs a transfer high voltage Vtx_hi and the RST row drivers 300, 400 output a reset high voltage Vrst_hi. This allows for a complete flush of the photosensor just before integration.

For an unselected row that is in integration, the TX row driver 200 outputs a negative transfer low voltage Vtx_lo. This allows photo-generated charge to collect at the photosensor. The RST row drivers 300, 400 maintain the supply voltage VAA output. The combination of the negative transfer low voltage Vtx_lo applied to the transfer gate and the non-boosted reset signal applied to the reset gate reduces the induction of dark current.

After a row has been integrated, it is selected to be sampled for readout. During a reset sampling, the TX row driver 200 outputs a ground voltage AGND while the RST row drivers 300, 400 output a boosted reset high voltage Vrst_hi. Thus, the floating diffusion region is sampled while the reset transistor is fully on. During a signal sampling, the TX row driver 200 outputs a boosted transfer high voltage Vtx_hi while the RST row drivers 300, 400 output a reset low voltage Vrst_lo. Thus, the floating diffusion region is sampled while the transfer transistor is fully on.

The RST and TX row drivers 200, 300, 400 of FIGS. 2-4 may be used in a row driver unit 500 for a pixel array in an imager. The row driver unit 500 is illustrated in FIG. 5. The illustrated row driver unit 500 includes a RST row driver 300, though RST row driver 400 could be substituted in its place. Though each row of a pixel array requires both a RST and a TX row driver, the row driver unit 500 illustrates one method of consolidating the row drivers for 4:1 vertical four-way shared pixels. In the row driver unit 500, only one RST row driver 300 is used for four rows. If the rows have been selected via logic circuit 510 (which includes as input signals a global row control signal row_all, a specific row control signal row_en, and a specific set of four-rows control signal select_quad), the RST row driver 300 provides appropriate RST row driving voltages to each of the four rows controlled by the row driver unit 500. Logic circuit 510 provides a high select signal if the specific row control signal row_en is high and at least one of the global row control signal row_all and specific set of four-rows control signal select_quad is high. Though not addressed in this patent application, a row control ROW row driver 520 is also included in the row driver unit 500 and is used to provide ROW gating signals to each of four pixel rows. Each of the four rows controlled by the row driver unit has its own TX row driver 200A, 200B, 200C, 200D to provide a TX row driving voltage TXA, TXB, TXC, TXD. The logic used to determine which of the TX row drivers is to be used at any given time is included in a logic stage 530. According to the operations of logic stage 530, the TX row drivers 200A-200D are each selected if the RST row driver 300 has been selected and if either the global row control signal row_all is high or the individual TX row driver select signals select_A, select_B, select_C, select_D are high. Additionally, if the summing signal en_pix_sum is high, TX row drivers 200A, 200C will be selected at the same time while TX row drivers 200B, 200D will be selected simultaneously.

Variations of the row driver unit 500 may include a row driver unit that includes a set of RST and ROW row drivers for two pixel rows (with a TX row driver for each of the two rows controlled by the RST and ROW row drivers). This variation is know as a 2:1 two-way shared pixel row driver architecture. The architecture illustrated in FIG. 5 is for a 4:1 four-way shared pixel row driver.

Figure 6A:
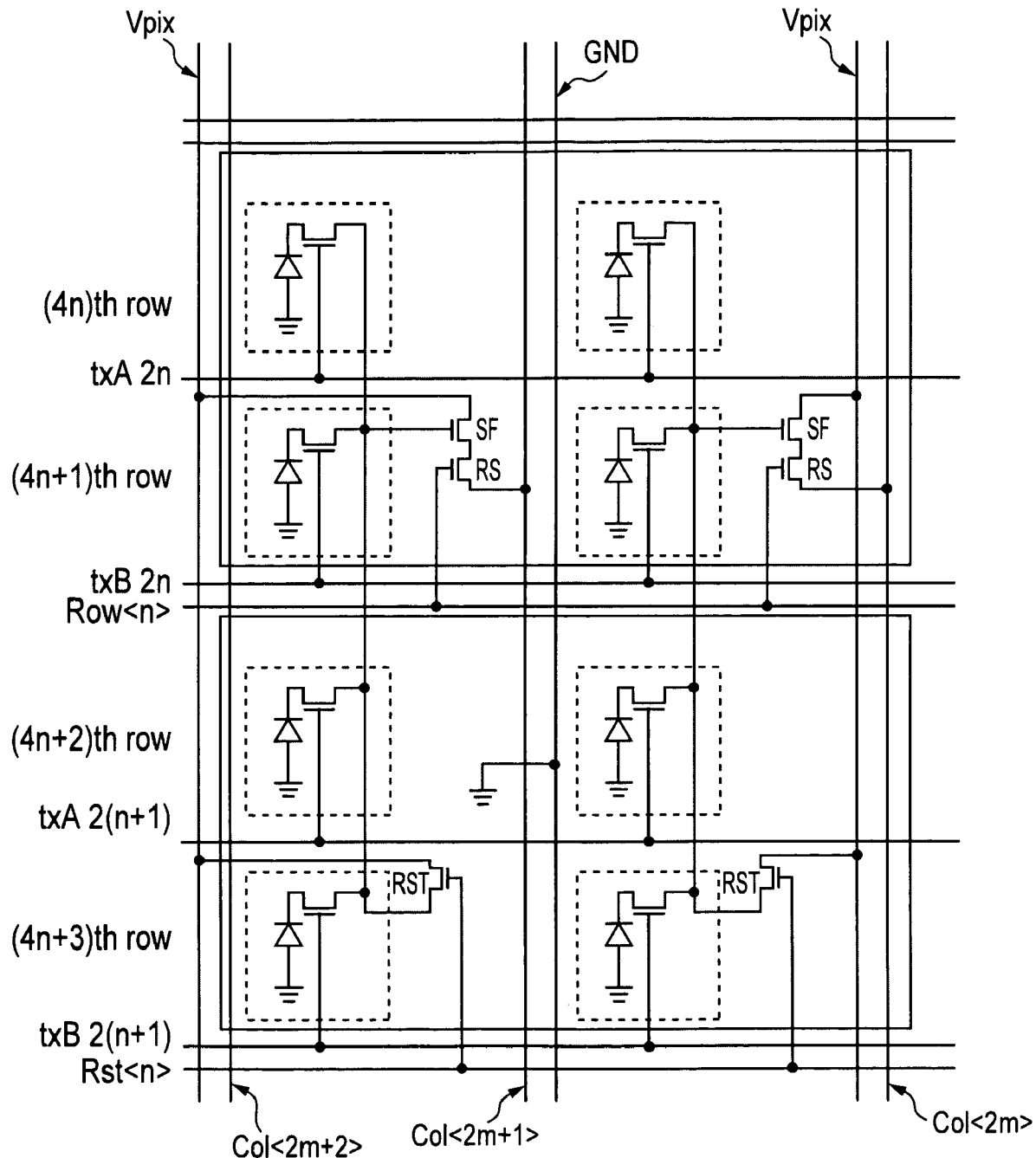
FIG. 6A is a schematic diagram of a 4:1 four-way shared pixel architecture, according to the disclosed embodiments.
Figures 2, 6B:
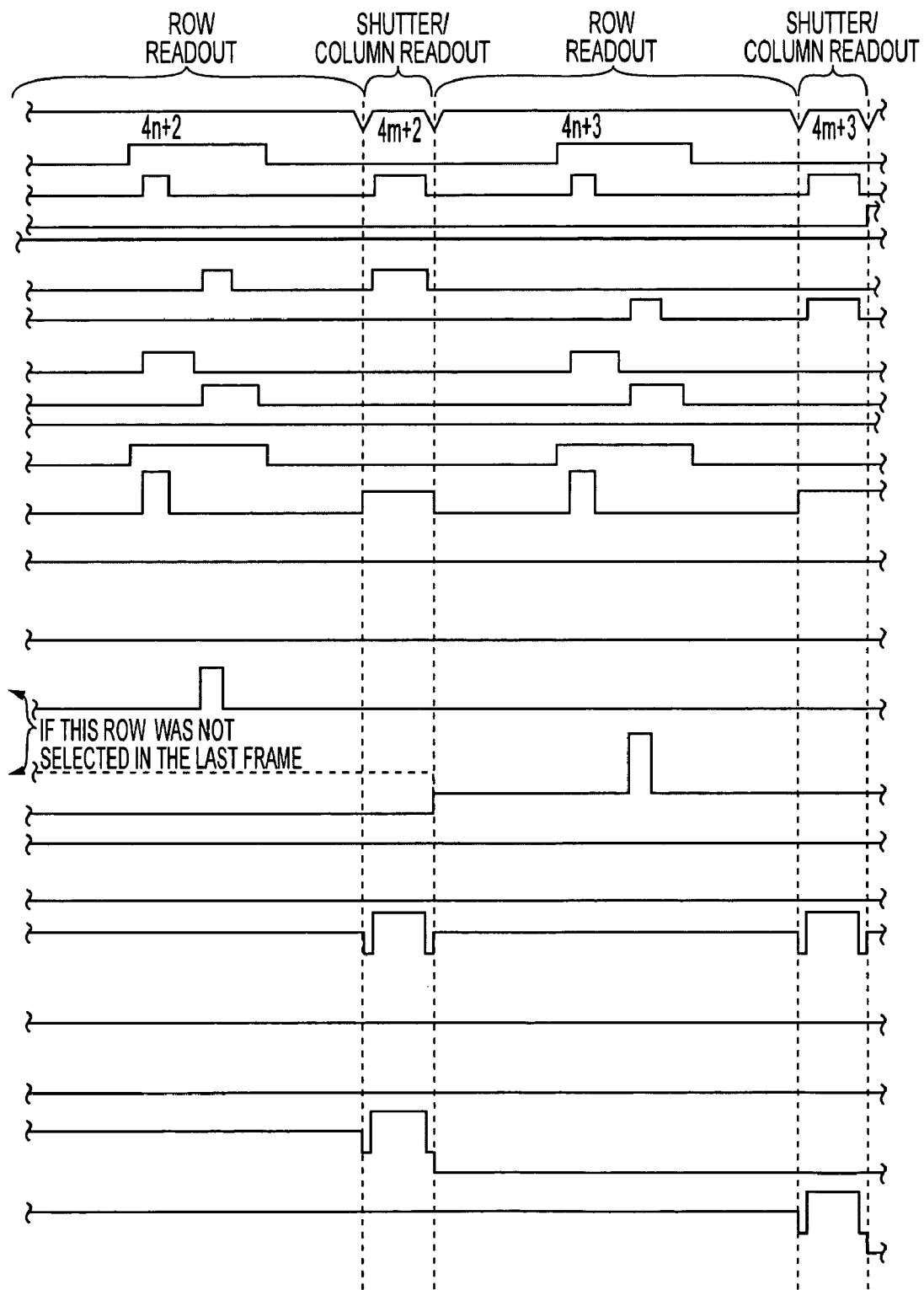
FIG. 6B is a timing diagram for a 4:1 four-way shared pixel architecture, according to the disclosed embodiments.
Figures 3, 6B:
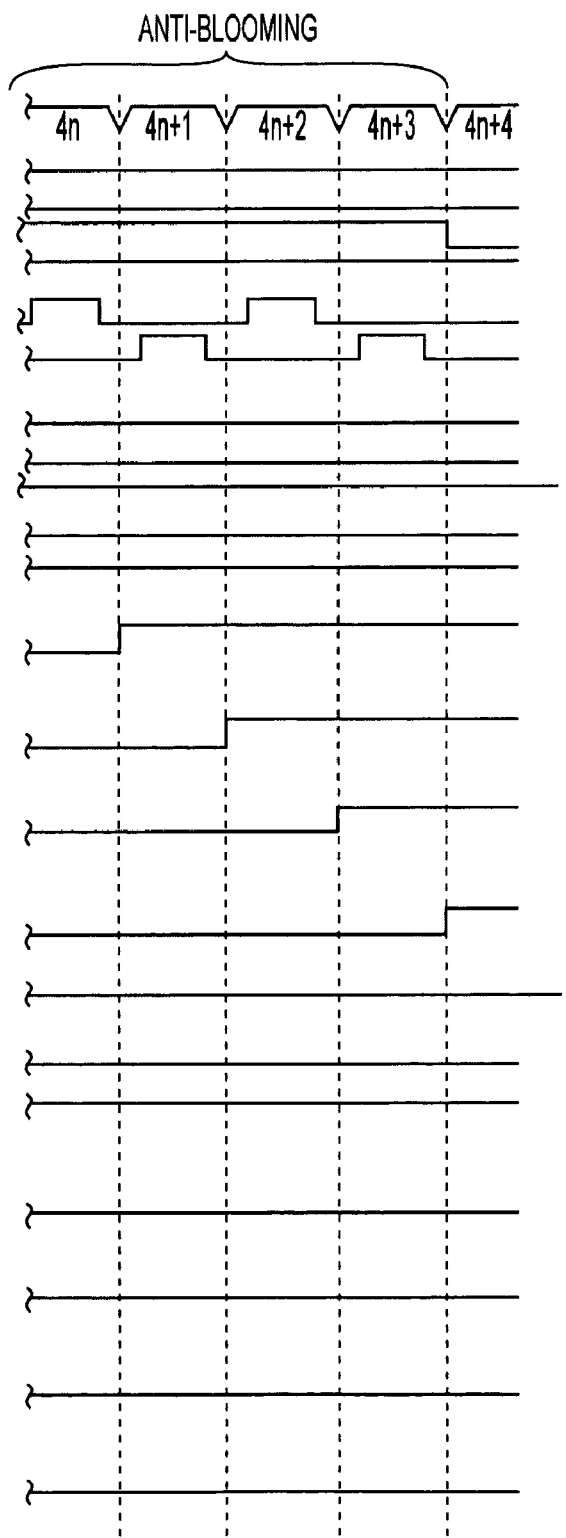

For a 4:1 four-way shared pixel architecture as illustrated in FIG. 6A, the row driver unit 500 operates in accordance with a timing diagram 600 as illustrated in FIG. 6B. The architecture of FIG. 6A illustrates two sets of 4:1 four-way shared pixels. One set of pixels outputs signals along column line 2m+1. A second set of pixels outputs signals along column line 2m. The pixels are organized in four rows 4n, 4n+1, 4n+2, 4n+3. The pixels are supplied by a pixel voltage Vpix and a ground voltage GND, and pixel transistors are gated by row, reset and transfer transistor gating voltages provided by row drivers as disclosed in FIGS. 200, 300, 400, 500. The transfer transistor gating voltages are txA 2n, txB 2n, txA 2(n+1), txB 2(n+1).

The timing diagram 600 includes input signals in the upper-most section U, row driver unit output signals for the row-readout phase in the middle section M of the timing diagram 600, and row driver unit output signals for the shutter phase in the lower section L of the timing diagram 600. Horizontally, the diagram 600 is organized into repetitive row readout and shutter and column readout phases. For example, the first column indicates a shutter phase for pixels in row 4m−1. The shutter phase represents the beginning part of an integration phase. Integration of pixels in row 4m−1 then commences. Then, there is a row readout phase for pixels in row 4n. This is followed by column readout phase for pixels in row 4n and a shutter phase for pixels in row 4m. When rows 4n, 4n+1, 4n+2, 4n+3 have each been read-out, an additional anti-blooming phase occurs.

As explained above, the transfer transistors of pixels in all rows are initialized to a supply voltage VAA. For the shutter phase timing in lower section L, the reset signal is boosted in order to completely deplete the photosensor and floating diffusion regions. During a shutter phase, the specific row control signal row_add for a corresponding row, e.g., row 4m, is made high. Momentarily, the transfer row driver 200 output is at a ground voltage AGND, because the row control signal select is high and the transfer enable signal TXA_en is low. Once the transfer enable signal TXA_en goes high, the transfer row driver 200 outputs a transfer high voltage Vtx_hi. This serves to completely deplete any electrons in the photosensor region in preparation for integration. Because the enable signal en (from FIG. 2) is high, the latch I1 is turned on and the output latch_out of the latch I1 becomes low (because the transfer data signal mtx_data is also low). Thus, when the transfer enable signal TXA_en moves low again (which brings the transfer transistor to a level of ground voltage AGND) and the row control signal select is also brought low, the transfer row driver 200 will output a transfer low voltage Vtx_lo during the entirety of the integration phase.

The row readout phases are marked by boosted reset and transfer signals for the selected rows, as is indicated in the middle section M of the timing diagram 600. For rows that have not been integrated, meaning that the rows were not selected in a previous frame due to the imager being in skipping or windowing mode, for example, the transfer transistors of the rows are still at the initialized supply voltage VAA. For rows that have been integrating, the transfer transistors are at the negative transfer low voltage Vtx_lo, as explained above. Once the row to be read-out is selected, the transfer transistors in the row move to the ground voltage AGND. Row read-out occurs when the transfer and reset signals are boosted.

After each row in the 4:1 four-way shared pixel has been read-out, the reset and transfer transistors are again set at an elevated level (at the supply voltage VAA) in order to protect these rows from blooming. This occurs as a result of the transfer data signal mtx_data being moved high and then enabling the latch I1 momentarily by the enable signal en so that the latch outputs a high signal latch_out. When the latch output signal latch_out is high and when the row is no longer selected (the row control signal select moves low), the transfer transistors in the row are raised to the supply voltage VAA. This occurs during the anti-blooming phase.

Figure 7A:
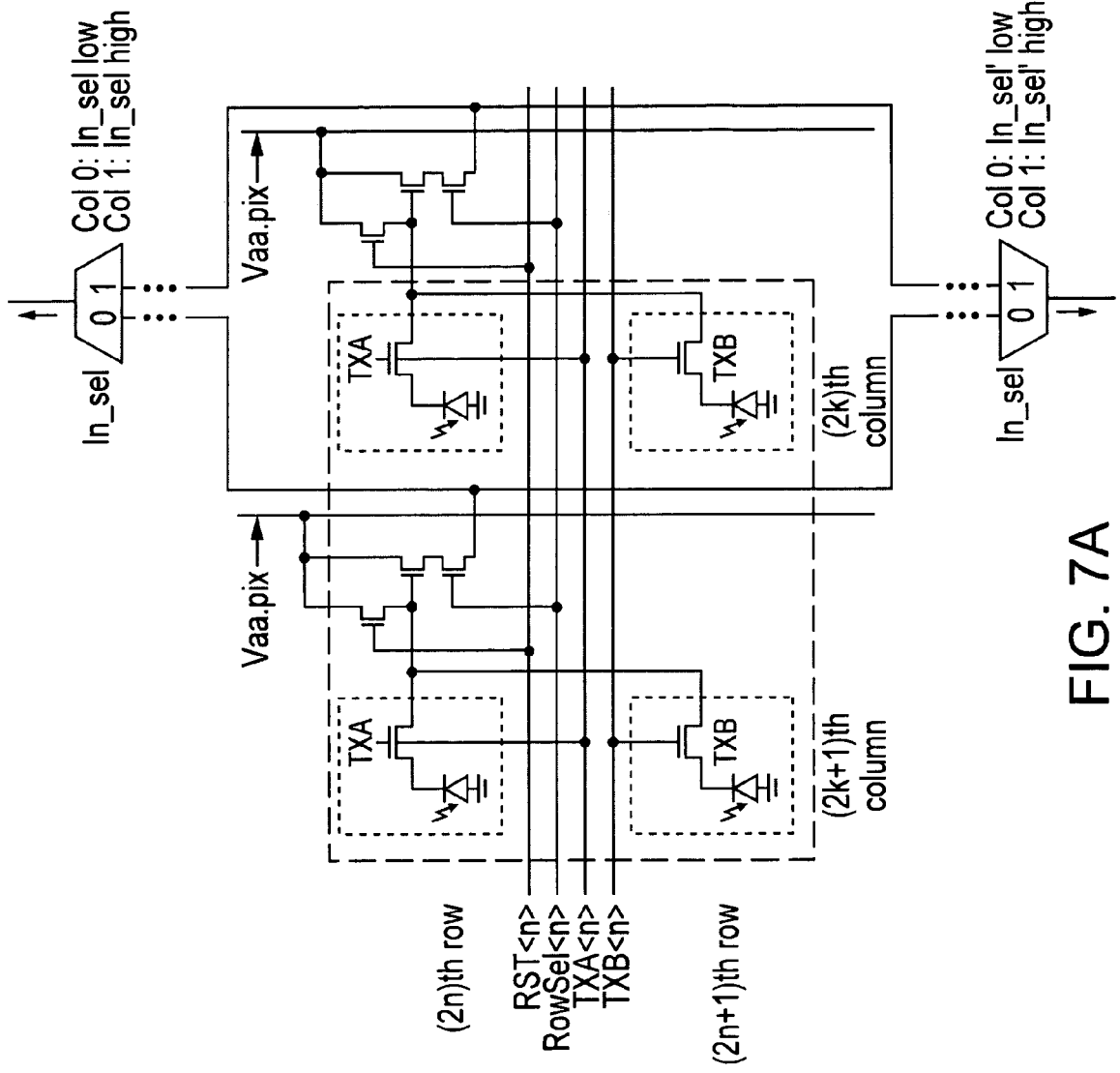
FIG. 7A is a schematic diagram of a 2:1 two-way shared pixel architecture, according to the disclosed embodiments.
Figures 2, 7B:
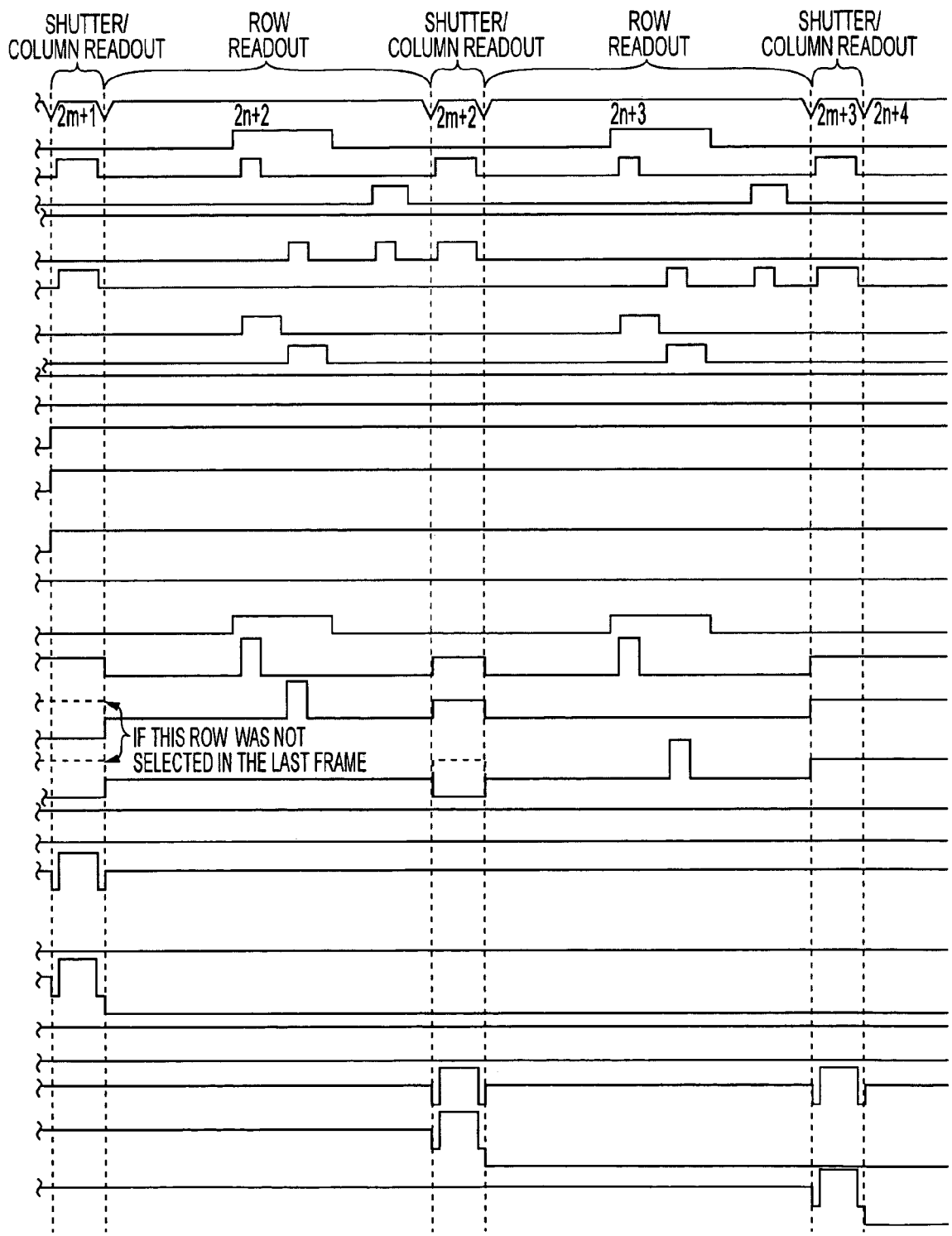
FIG. 7B is a timing diagram for a 2:1 two-way shared pixel architecture, according to the disclosed embodiments.

For a 2:1 two-way shared pixel architecture (as illustrated in FIG. 7A) wherein two adjacent rows share a same output from a row driver, the row driver unit operates in accordance with a timing diagram 700 as illustrated in FIG. 7B. The timing diagram 700 is organized in the same manner as the timing diagram 600 (of FIG. 6B). Again, one notes that reset and transfer signals are boosted only during the sampling and shutter phases, and non-integrating rows are maintained at a supply voltage VAA. An additional anti-blooming phase is not necessary with this architecture as the moving of transfer transistor signals to the supply voltage VAA may be done while a second set of pixels is being read-out.

Figure 8:
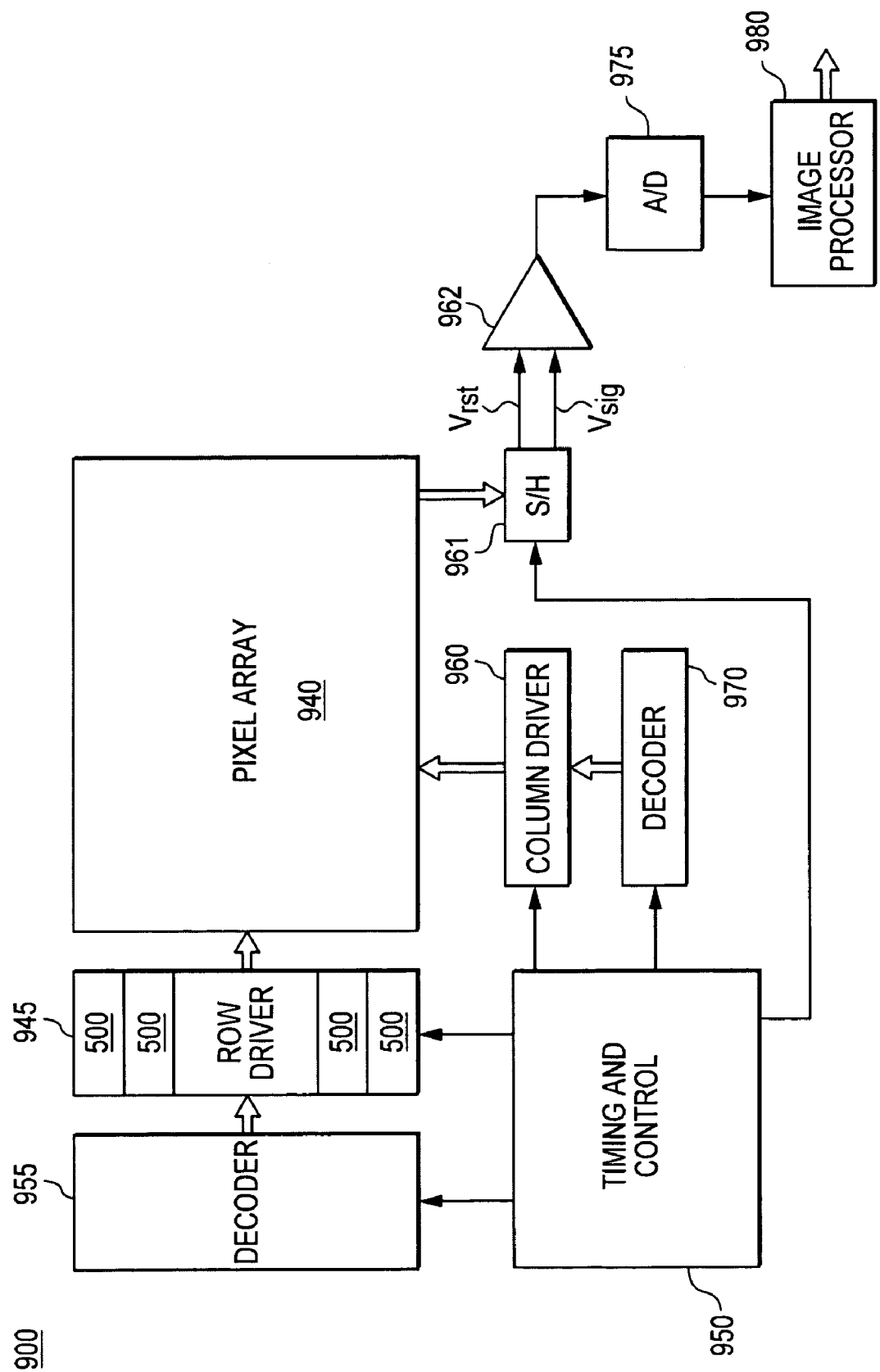
FIG. 8 is a block diagram of an imager, according to the disclosed embodiments.

The TX and RST row drivers are implemented within row driver units of an imager or imager system. FIG. 8 illustrates a block diagram of a semiconductor CMOS imager 900 having a pixel array 940 including a plurality of pixels arranged in a predetermined number of columns and rows. The pixels in the array 940 are configured to receive incident photons and to convert the incident photons into electrical signals. Pixels of pixel array 940 are output row-by-row as activated by the control signals from row driver 945 in response to a row address decoder 955. Row driver 945 includes row driver units 500. Column driver 960 and column address decoder 970 are also used to selectively activate individual pixel columns. A timing and control circuit 950 controls address decoders 955, 970 for selecting the appropriate row and column lines for pixel readout. The control circuit 950 also controls the row and column driver circuitry 945, 960 such that driving voltages may be applied.

As explained above, each pixel generally outputs both a pixel reset signal $V_{rst}$ and a pixel image signal $V_{sig}$, which are read by a sample and hold circuit 961 according to a correlated double sampling ("CDS") scheme. The pixel reset signal $V_{rst}$ represents a reset state of a pixel. The pixel image signal $V_{sig}$ represents the amount of charge generated by the photosensor in the pixel in response to applied light during an integration period. The pixel reset and image signals $V_{rst}$, $V_{sig}$ are sampled, held and amplified by the sample and hold circuit 961. The sample and hold circuit 961 outputs amplified pixel reset and image signals $V_{rst}$, $V_{sig}$. The difference between $V_{sig}$ and $V_{rst}$ represents the actual pixel output with common-mode noise eliminated. The differential signal ($V_{rst}$−$V_{sig}$) is produced by differential amplifier 962 for each readout pixel. The differential signals are digitized by an analog-to-digital converter 975. The analog-to-digital converter 975 supplies the digitized pixel signals to an image processor 980, which forms and outputs a digital image.

Figure 9:
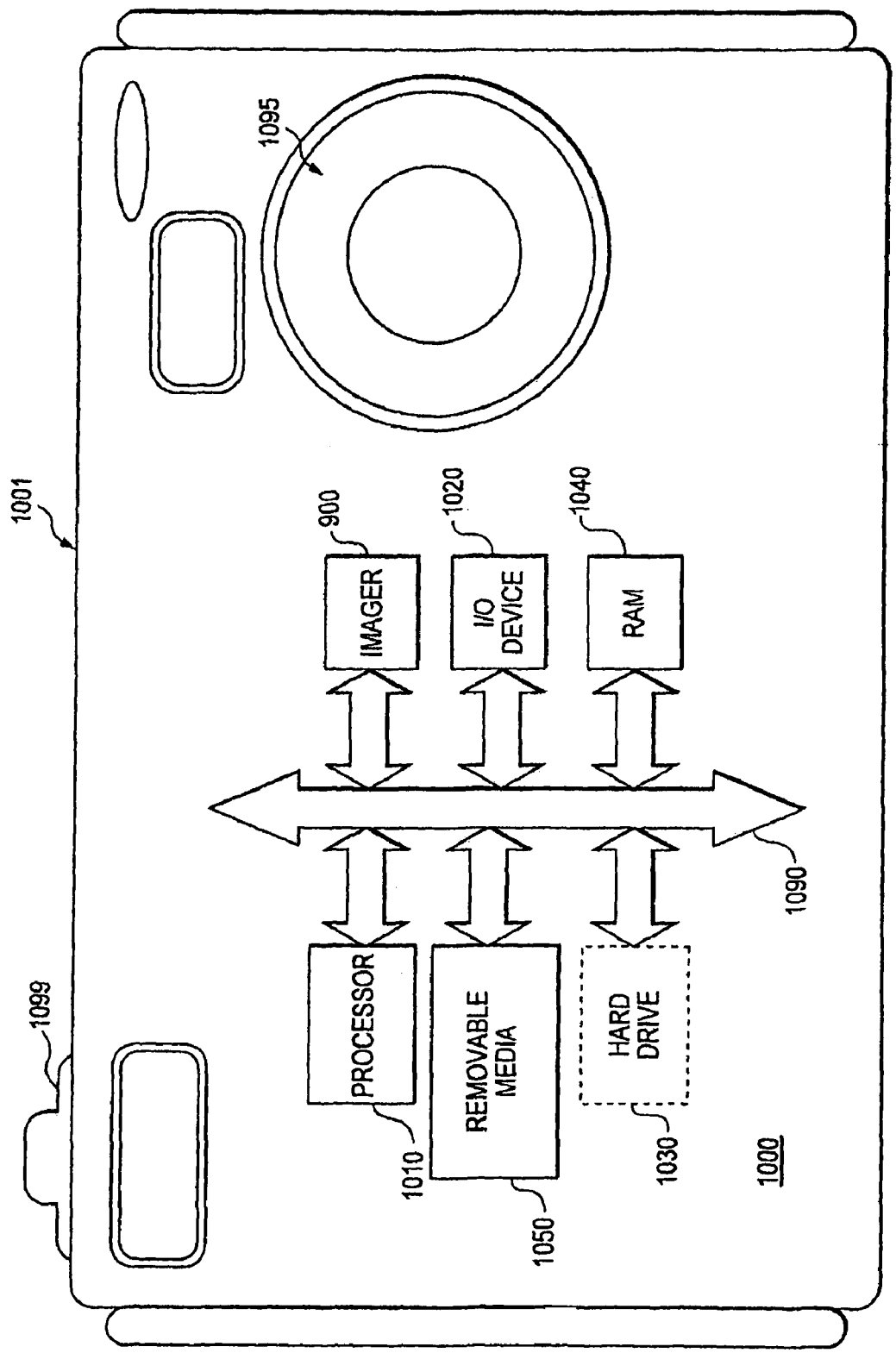
FIG. 9 is a block diagram of an imaging system, according to the disclosed embodiments.

The TX and RST row drivers disclosed above may be used in any system that employs an imager device, including, but not limited to a computer system, camera system, scanner, machine vision, vehicle navigation, video phone, surveillance system, auto focus system, star tracker system, motion detection system, image stabilization system, and other imaging systems. Example digital camera systems in which the invention may be used include both still and video digital cameras, cellular telephone cameras, handheld personal digital assistant (PDA) cameras, and other types of cameras. FIG. 9 shows a typical system 1000, which is part of a digital camera 1001. The system 1000 includes an imager 900, which includes the TX and RST row drivers, constructed as described above. System 1000 generally comprises a processing unit 1010, such as a microprocessor, that controls system functions and which communicates with an input/output (I/O) device 1020 over a bus 1090. Imager 900 also communicates with the processing unit 1010 over the bus 1090. The processor system 1000 also includes random access memory (RAM) 1040, and can include removable media 1050, such as flash memory, which also communicates with the processing unit 1010 over the bus 1090. Lens 1095 focuses an image on a pixel array of the imager 900 when shutter release button 1099 is pressed.

The processor system 1000 could alternatively be part of a larger processing system, such as a computer. Through the bus 1090, the processor system 1000 illustratively communicates with other computer components, including but not limited to, a hard drive 1030 and one or more removable media devices 1050. The imager 900 may be combined with a processor, such as a central processing unit, digital signal processor, or microprocessor, with or without memory storage on a single integrated circuit or on a different chip than the processor.

What is claimed as new and desired to be protected by Letters Patent of the United States is:

1. A circuit that generates control signals for transistors in a pixel, comprising:
   a transfer transistor control signal circuit that outputs a positive boosted transfer transistor control signal for a photosensor-to-floating diffusion region charge transfer operation and for a shutter operation just before integration of the pixel, that outputs a negative transfer transistor control signal to the pixel during integration of the pixel, and that outputs a positive non-boosted transfer transistor control signal to the pixel when the pixel is not selected for readout and not in integration; and
   a reset transistor control signal circuit that outputs a positive boosted reset transistor control signal during a floating diffusion region reset of the pixel when selected for readout and for a shutter operation just before integration and that outputs a positive non-boosted reset transistor control signal to the pixel when not selected for readout, wherein the transfer transistor control signal circuit comprises a four branch output stage, each branch representing a different current path, a latch logic stage for providing control signals to the output stage, and a boosted control signal stage for providing boosted control signals to the output stage, and wherein each output branch comprises one of a ground voltage output branch able to output a ground voltage, a supply voltage output branch able to output a supply voltage, a boosted transfer high voltage output branch able to output a boosted transfer high voltage, and a negative transfer low voltage output branch able to output a negative transfer low voltage.

2. The circuit of claim 1, wherein the boosted transfer high voltage output branch is activated when a transfer enable signal and a row select signal input to the transfer transistor control signal circuit are high.

3. The circuit of claim 1, wherein the ground voltage output branch is activated when a transfer enable signal is low and a row select signal is high, the transfer enable signal and the row select signal being input to the transfer transistor control signal circuit.

4. The circuit of claim 1, wherein the supply voltage output branch is activated when a row select signal input to the transfer transistor control signal circuit is low and when a pixel row controlled by the control signal generating circuit is not in an integration phase.

5. The circuit of claim 1, wherein the negative transfer low voltage output branch is activated when a row select signal input to the transfer transistor control signal circuit is low and when a pixel row controlled by the control signal generating circuit is in an integration phase.

6. The circuit of claim 1, wherein the boosted transfer high voltage output branch and the ground output branch are gated by an output from the boosted control signal stage, the gating configured to prevent the formation of a short between the transfer high voltage and the ground voltage when a transfer enable signal input to the transfer control signal circuit switches from high to low.

7. The circuit of claim 2, wherein the boosted transfer high voltage output branch is activated by an output of the boosted control signal stage.

8. The circuit of claim 4, wherein the supply voltage output branch is gated by an output of the latch logic stage that indicates that the pixel row is not in an integration phase.

9. The circuit of claim 8, wherein the latch logic stage includes a latch whose output is high when the pixel row is not in an integration phase.

10. The circuit of claim 5, wherein the negative transfer low voltage output branch is gated by an output of the latch logic stage that indicates that the pixel row is in an integration phase.

11. The circuit of claim 10, wherein the latch logic stage includes a latch whose output is low when the pixel row is in an integration phase.

12. The circuit of claim 11, wherein the output of the supply voltage output branch is disabled if the latch output is set low.

13. A circuit that generates control signals for transistors in a pixel, comprising:
   a transfer transistor control signal circuit that outputs a positive boosted transfer transistor control signal for a photosensor-to-floating diffusion region charge transfer operation and for a shutter operation just before integration of the pixel, that outputs a negative transfer transistor control signal to the pixel during integration of the pixel, and that outputs a positive non-boosted transfer transistor control signal to the pixel when the pixel is not selected for readout and not in integration; and
   a reset transistor control signal circuit that outputs a positive boosted reset transistor control signal during a floating diffusion region reset of the pixel when selected for readout and for a shutter operation just before integration and that outputs a positive non-boosted reset transistor control signal to the pixel when not selected for readout, wherein the reset transistor control signal circuit comprises a three branch output stage, each branch representing a different current path, and a boosted control signal stage for providing control signals to the output stage, and wherein the output stage includes three output branches, each output branch comprising one of a supply voltage output branch able to output a supply voltage, a reset high voltage branch able to output a reset high voltage, and a reset low voltage output branch able to output a reset low voltage.

14. The circuit of claim 13, wherein the reset high voltage output branch is activated when a reset enable signal and a row select signal input to the reset transistor control signal circuit are high.

15. The circuit of claim 13, wherein the supply voltage output branch is activated when a row select signal input to the reset transistor control signal circuit is low and when an anti-bloom enable signal is high.

16. The circuit of claim 13, wherein the reset low voltage output branch is activated when a reset enable signal input to the reset transistor control signal circuit is low and either a row select signal input to the reset transistor control signal circuit is high or an anti-bloom enable signal is low.

17. The circuit of claim 13, wherein the reset high voltage output branch and the reset low voltage output branch are gated by an output from the boosted control signal stage, the gating configured to prevent the formation of a short between the reset high voltage and the reset low voltage when a reset enable signal input to the reset control signal circuit switches from high to low.

18. The circuit of claim 13, wherein the reset control signal circuit further comprises a latch logic stage whose output gates the activation of the supply voltage and reset low voltage output branches.

19. The circuit of claim 14, wherein the reset high voltage output branch is activated by an output of the boosted control signal stage.

20. The circuit of claim 18, wherein the supply voltage output branch is activated when a row select signal input to the reset transistor control signal circuit is low and when a pixel row controlled by the circuit is not in an integration phase.

21. The circuit of claim 18, wherein the reset low voltage output branch is activated when a row select signal input to the reset transistor control signal circuit is low and when a pixel row controlled by the circuit is in an integration phase.

22. The circuit of claim 20, wherein the supply voltage output branch is gated by an output of the latch logic stage that indicates that the pixel row is not in an integration phase.

23. The circuit of claim 22, wherein the latch logic stage includes a latch whose output is high when the pixel row is not in an integration phase.

24. The circuit of claim 21, wherein the reset low voltage output branch is gated by an output of the latch logic stage that indicates that the pixel row is in an integration phase.

25. The circuit of claim 24, wherein the latch logic stage includes a latch whose output is low when the pixel row is in an integration phase.

26. The circuit of claim 25, wherein the output of the supply voltage output branch is disabled if the latch output is set low.

27. An imager, comprising:
a pixel array; and
a row driver unit to provide transistor control signals to pixel rows of the pixel array, the row driver unit comprising:
a plurality of transfer transistor control signal row drivers that each comprises a four branch output stage, each branch representing a different current path, wherein each of the plurality of transfer transistor control signal row drivers outputs a positive boosted transfer transistor control signal during a photosensor-to-floating diffusion region charge transfer phase and during a shutter phase just before a pixel integration phase and outputs a positive non-boosted transfer transistor control signal to pixels in pixel rows that are not selected for readout and not in an integration phase; and a plurality of reset transistor control signal row drivers that each outputs a positive boosted reset transistor control signal during a floating diffusion region reset phase and during a shutter phase just before a pixel integration phase and outputs a positive non-boosted reset transistor control signal to pixels in pixel rows that are not selected for readout, wherein each output branch of the four branch output stage comprises one of a ground voltage output branch able to output a ground voltage, a supply voltage output branch able to output a supply voltage, a boosted transfer high voltage output branch able to output a boosted transfer high voltage, and a negative transfer low voltage output branch able to output a negative transfer low voltage.

28. A method of providing transistor control signals to pixels in a pixel array using a reset transistor control signal circuit having a three branch output stage, each branch representing a different current path, comprising:
providing a positive boosted transfer transistor control signal to a selected pixel row during a photosensor-to-floating diffusion region charge transfer phase and to an unselected pixel row during a shutter phase just before pixel integration;
providing a positive non-boosted transfer transistor control signal to an unselected pixel row during a non-integration phase;
providing a positive boosted reset transistor control signal to a selected pixel row during a floating diffusion region reset phase and to an unselected pixel row during a shutter phase just before pixel integration; and
providing a positive non-boosted reset transistor control signal to an unselected pixel row during a non-integration phase, wherein each branch of the three branch output stage of the reset transistor control signal circuit comprises one of a supply voltage output branch able to output a supply voltage, a reset high voltage branch able to output a reset high voltage, and a reset low voltage output branch able to output a reset low voltage.

29. The method of claim 28, wherein the positive boosted transfer transistor control signal is provided only during the photosensor-to-floating diffusion region charge transfer phase and the shutter phase.

30. The method of claim 28, wherein the positive non-boosted transfer transistor control signal and the positive non-boosted reset transistor control signal are provided to all unselected non-integrating pixel rows.

31. The method of claim 28, wherein the positive boosted reset transistor control signal is provided only during the floating diffusion region reset phase and the shutter phase.

* * * * *